United States Patent
Sella et al.

(10) Patent No.: US 10,150,441 B2
(45) Date of Patent: Dec. 11, 2018

(54) DAMPENING DRIVER AIRBAG ASSEMBLIES AND RELATED SYSTEMS AND METHODS

(71) Applicant: Autoliv ASP, Inc., Ogden, UT (US)

(72) Inventors: Terry Allen Sella, Clarkston, MI (US); David Robert Palm, Jr., Davisburg, MI (US); Christopher Donald Morgan, Sterling Heights, MI (US); Marcus Weber, Untertheres (DE); Yutaka Hirota, Ibaraki (JP); Zhiyong Jiang, Shanghai (CN); Remi Baillivet, Dampierre-en-Bray (FR)

(73) Assignee: Autoliv ASP, Inc., Ogden, UT (US)

( * ) Notice: Subject to any disclaimer, the term of this patent is extended or adjusted under 35 U.S.C. 154(b) by 39 days.

(21) Appl. No.: 15/426,929

(22) Filed: Feb. 7, 2017

(65) Prior Publication Data
US 2018/0111580 A1   Apr. 26, 2018

Related U.S. Application Data

(60) Provisional application No. 62/411,486, filed on Oct. 21, 2016.

(51) Int. Cl.
*B60R 21/203* (2006.01)

(52) U.S. Cl.
CPC .............................. *B60R 21/2037* (2013.01)

(58) Field of Classification Search
CPC .............. B60R 21/2037; B60R 21/217; B60R 2021/2173
See application file for complete search history.

(56) References Cited

U.S. PATENT DOCUMENTS

| 5,409,256 A * | 4/1995 | Gordon ............... B60R 21/2035 280/728.2 |
| 8,616,577 B1 | 12/2013 | Matsu et al. |
| 8,985,623 B2 * | 3/2015 | Kondo ............... B60R 21/2037 280/731 |

(Continued)

FOREIGN PATENT DOCUMENTS

| EP | 1790536 | 11/2006 |
| WO | WO2016/170051 | 10/2016 |

OTHER PUBLICATIONS

International Search Report, PCT/US2017/048450, dated Nov. 8, 2017 (2 pgs).

(Continued)

*Primary Examiner* — Darlene P Condra
(74) *Attorney, Agent, or Firm* — Matthew D. Thayne; Thayne and Davis LLC

(57) ABSTRACT

Driver airbag cushion assemblies comprising dampening means. In some embodiments, the assembly may comprise a driver airbag module, a steering wheel armature, and an intermediate plate positioned between the driver airbag module and the steering wheel armature. The assembly may further comprise one or more horn actuators, such as horn springs coupled to the airbag module, and one or more dampening members. The one or more dampening members may be used to couple two or more of the armature, plate, and airbag module together. In some embodiments, the dampening member(s) may be functionally and/or physically decoupled from the one or more horn actuators.

22 Claims, 22 Drawing Sheets

(56) References Cited

U.S. PATENT DOCUMENTS

| | | | |
|---|---|---|---|
| 9,366,311 B2 | 6/2016 | Gustavsson | |
| 2002/0036397 A1* | 3/2002 | Fujita | B60Q 1/0082 280/731 |
| 2003/0067143 A1* | 4/2003 | Nelson | B60R 21/217 280/728.2 |
| 2004/0094937 A1* | 5/2004 | Steimke | B60R 21/203 280/728.2 |
| 2006/0197323 A1 | 9/2006 | Pillsbury, IV et al. | |
| 2006/0208469 A1 | 9/2006 | Marotzke et al. | |
| 2009/0218739 A1* | 9/2009 | Terada | B60R 21/2037 267/2 |
| 2011/0204602 A1 | 8/2011 | James et al. | |
| 2014/0313982 A1 | 10/2014 | Schwarzbauer et al. | |
| 2016/0031399 A1 | 2/2016 | Andersson | |
| 2017/0297604 A1* | 10/2017 | Raikar | B62D 1/10 |

OTHER PUBLICATIONS

Written Opinion, PCT/US2017/048450, dated Nov. 8, 2017 (5 pgs).
Machine Translation EP1790536 (5 pgs).

* cited by examiner

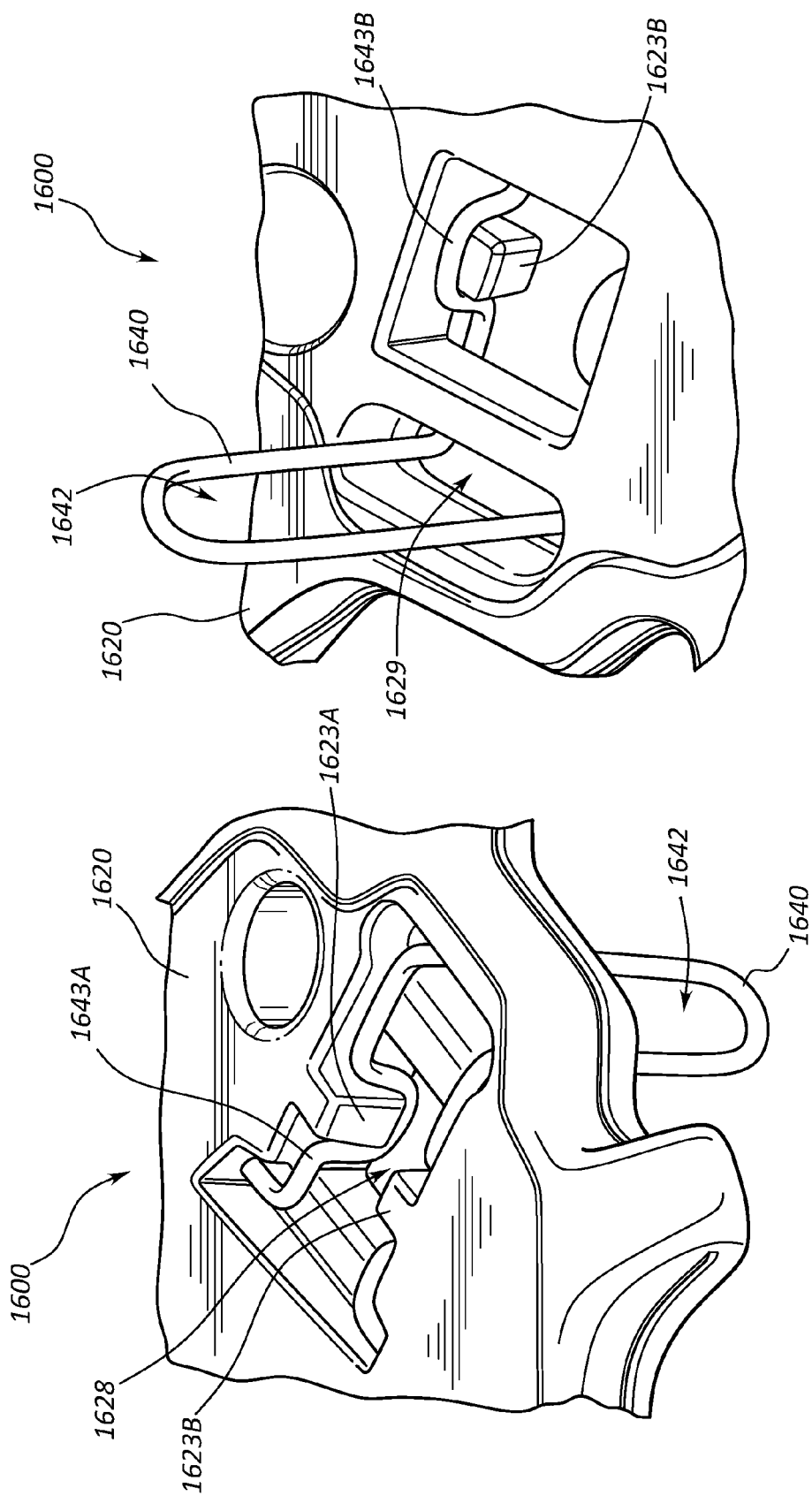

DAMPENING DRIVER AIRBAG ASSEMBLIES AND RELATED SYSTEMS AND METHODS

RELATED APPLICATIONS

This application claims the benefit under 35 U.S.C. § 119(e) of U.S. Provisional Patent Application No. 62/411,486 filed Oct. 21, 2016 and titled "DAMPENING DRIVER AIRBAG ASSEMBLIES AND RELATED SYSTEMS AND METHODS," which application is incorporated herein by reference in its entirety.

SUMMARY

Many current driver/steering wheel airbag assemblies suffer from drawbacks associated with the dampening means they employ. For example, such dampening means may be too large, too costly, may fail to meet desired vibration/frequency targets, and/or may be difficult or impossible to tune.

The present inventors have therefore determined that it would be desirable to provide systems and methods that overcome one or more of the foregoing limitations and/or other limitations of the prior art. In some embodiments, the inventive concepts disclosed herein may accomplish one or more such goals by functionally decoupling the dampening means, which may comprise flexible, yet resilient, dampening members, from other aspects/elements of a driver airbag assembly that may also have a natural effective spring rate, such as the horn spring(s) and/or horn spring assembly. In some such embodiments, the dampening members may therefore be positioned in between the armature and an intermediate member, such as a plate, which is positioned in between the driver airbag module and the steering wheel armature. This functional decoupling may be used to prevent the horn spring(s) and/or its related assembly components from effecting the natural frequency of the assembly. Because the horn spring(s)/functionality is typically coupled with the airbag module, this decoupling of the dampening members may be useful in overcoming one or more of the limitations described above.

In a more particular example of an airbag assembly according to some embodiments, the assembly may comprise a driver airbag module, a steering wheel armature, and an intermediate plate positioned between the driver airbag module and the steering wheel armature. The assembly may further comprise one or more horn springs or other horn actuation members coupled to the airbag module, and one or more dampening members coupled to the steering wheel armature. A flexible coupling member may be coupled to the airbag module, the steering wheel armature, and the intermediate plate by way of a plurality of windows.

In an example of a vehicle steering wheel assembly according to some embodiments, the assembly may comprise a steering wheel armature; an intermediate plate coupled to the steering wheel armature; a driver airbag module coupled to the intermediate plate such that the intermediate plate is positioned in between the driver airbag module and the steering wheel armature; and a horn assembly positioned between the driver airbag module and the steering wheel armature. In some embodiments, the horn assembly may be positioned between the driver airbag module and the intermediate plate. One or more dampening members may be coupled (in some embodiments, rigidly coupled) to the intermediate plate and coupled (in some embodiments, rigidly coupled) to at least one of the steering wheel armature, the driver airbag module, and a steering wheel decorative member coupled with the steering wheel armature. In some embodiments, the one or more dampening members may be coupled (in some embodiments, rigidly coupled) to the intermediate plate and coupled (in some embodiments, rigidly coupled) to at least one of the steering wheel armature and a steering wheel decorative member coupled with the steering wheel armature.

Some embodiments may further comprise one or more coupling members configured to couple the steering wheel armature, the intermediate plate, and the driver airbag module together. In some such embodiments, the coupling member(s) may comprise a flexible coupling member. In some such embodiments, the coupling member(s) may comprise a flexible wire, such as either a single length of wire or two lengths of wire extending parallel to one another.

In some embodiments comprising a flexible wire coupling member, the flexible wire may comprise at least one bend, wherein at least one of the steering wheel armature and the intermediate plate may comprise a slot configured to receive the at least one bend therein. In some such embodiments, the flexible wire may comprise a first bend extending through a first slot formed in the steering wheel armature and a second bend extending through a second slot formed in the intermediate plate.

In other embodiments, the at least one bend may comprise a pair of opposing bends, and the at least one of the steering wheel armature and the intermediate plate may comprise a pair of opposing slots configured to receive the pair of opposing bends therein.

In some embodiments, the flexible wire may comprise one or more U-shaped sections and/or may be configured to couple at least two of the layers/components of the assembly together within a single plane of the flexible wire.

Some embodiments may further comprise a finger or other protruding member configured to extend between the pair of opposing slots so as to prevent the pair of opposing bends from being withdrawn from the pair of opposing slots. The finger/protruding member may extend, for example, from the steering wheel armature.

In some embodiments, the flexible coupling member(s) may comprise a plurality of windows, such as an upper window configured to receive a portion of the intermediate plate therethrough, and a lower window configured to receive a portion of the steering wheel armature therethrough. In some such embodiments, the intermediate plate may comprise a projecting member configured to engage the upper window, and the steering wheel armature may comprise a projecting member configured to engage the lower window. In some embodiments, the lower window may be angled away from the upper window.

The lower window may comprise a lower window width that differs from an upper window width of the upper window.

In some embodiments, the intermediate plate may comprise a projecting member configured to engage the upper window, wherein the steering wheel armature comprises a projecting member configured to engage the lower window, and wherein the projecting member of the intermediate plate has a width that differs from a width of the projecting member of the steering wheel armature such that the lower window can engage the projecting member of the steering wheel armature but cannot engage the projecting member of the intermediate plate.

The horn assembly may comprise at least one horn actuation member, such as one or more horn springs. The at least one horn actuation member may be rigidly coupled between the driver airbag module and the steering wheel armature. In some such embodiments, the at least one horn actuation member may be rigidly coupled between the driver airbag module and the intermediate plate.

In an example of a driver airbag cushion assembly according to some embodiments, the assembly may comprise a driver airbag module and an intermediate member, such as an intermediate plate, coupled to the driver airbag module. The driver airbag module may be configured to be coupled to a steering wheel armature. One or more dampening members may be rigidly coupled with the intermediate member and may be further configured to be rigidly coupled to at least one of the driver airbag module and a steering wheel armature. The driver airbag cushion assembly may be configured to be coupled with a steering wheel armature such that the at least one dampening member is either: (1) rigidly coupled to the driver airbag module and such that at least one horn spring associated with a horn of a vehicle steering wheel comprising the steering wheel armature is directly coupled to the steering wheel armature; or (2) rigidly coupled to the steering wheel armature and such that at least one horn spring associated with a horn of a vehicle steering wheel comprising the steering wheel armature is directly coupled to the driver airbag module.

In some embodiments, at least one horn spring may be directly coupled with the driver airbag module. The at least one dampening member may be configured to extend through an opening in the steering wheel armature, and, in some embodiments, may be further configured to extend through an opening in the intermediate member.

In an example of a vehicle steering wheel assembly according to other embodiments, the assembly may comprise a steering wheel armature; an intermediate plate or other intermediate member coupled to the steering wheel armature; a driver airbag module coupled to the intermediate member/plate such that the intermediate member/plate is positioned in between the driver airbag module and the steering wheel armature; and a horn assembly comprising at least one horn actuation member, such as a horn spring. The at least one horn spring is directly coupled to the driver airbag module and positioned between the driver airbag module and the steering wheel armature. The assembly may further comprise one or more dampening members coupled to the intermediate plate. The dampening member(s) may be not directly coupled to the driver airbag module.

In some embodiments, the dampening member(s) may be coupled (in some such embodiments, rigidly coupled) to the intermediate plate, and the at least one dampening member may be coupled (in some such embodiments, rigidly coupled) to the steering wheel armature.

Some embodiments may further comprise one or more coupling members, such as flexible coupling members, non-rigidly coupling the steering wheel armature, the intermediate plate, and the driver airbag module together.

In some embodiments, each of the coupling members may be configured to engage a corresponding projecting member of at least one of the steering wheel armature, the intermediate plate, and the driver airbag module.

In some embodiments, each of the coupling members comprises at least two windows. The at least two windows may differ in size and/or shape so as to prevent a lower window of the at least two windows from engaging a projecting member of the steering wheel armature.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which:

FIG. 16A is a perspective view of a portion of certain components of a driver airbag assembly according to yet other embodiments taken from a first side;

FIG. 16B is a perspective view of a portion of the driver airbag assembly of FIG. 16A taken from a second side opposite the first side;

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to driver airbag cushion assemblies having improved dampening means. In some embodiments, the assembly may be configured to functionally and/or physically decouple the dampening means, an example of which may comprise one or more dampening members, from the horn springs and/or horn spring assembly.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
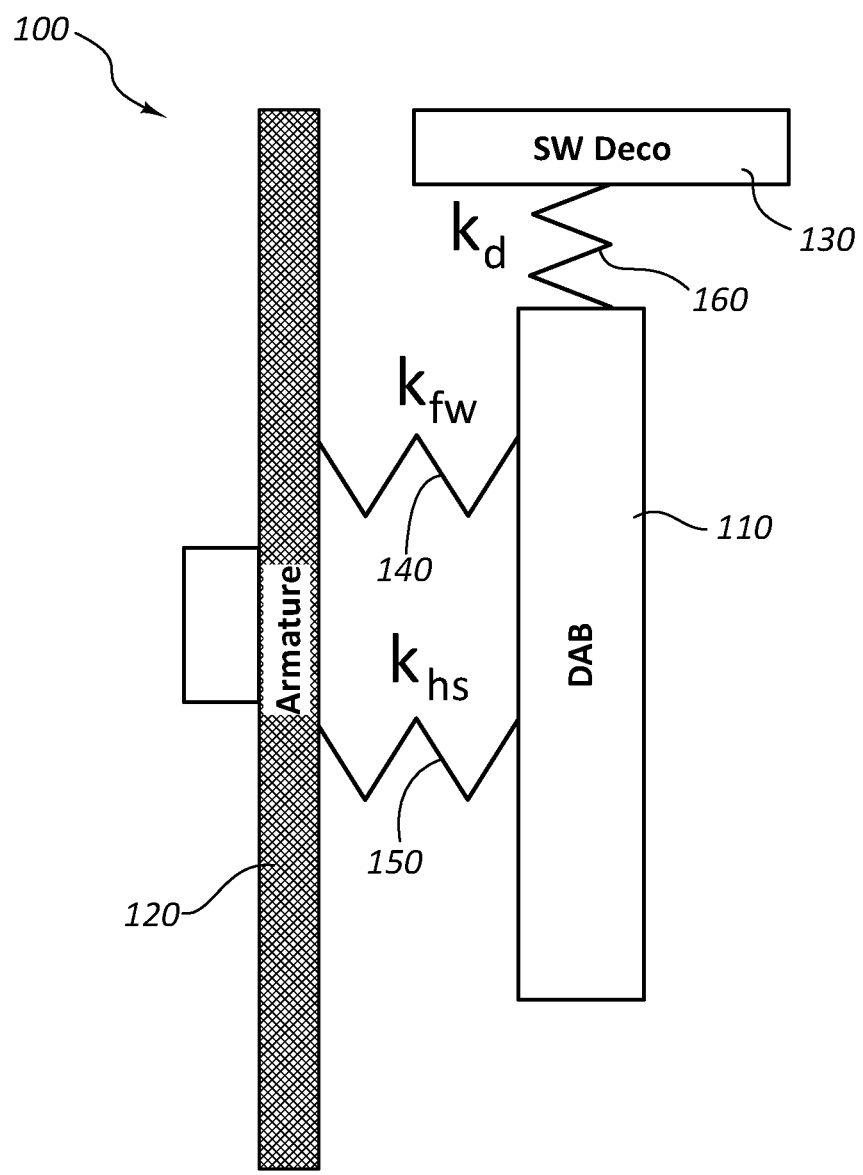
FIG. 1 is a schematic diagram illustrating an example of a driver airbag assembly according to some embodiments.

FIG. 1 is a schematic diagram illustrating a driver airbag assembly 100 comprising an airbag module 110, a steering wheel armature 120, and a steering wheel decorative member 130. Springs are schematically positioned between the various components to illustrate effective spring rates between such components. More particularly, $K_{fw}$ represents a spring rate associated with a flexible window of a coupling member 140 that may be used to couple the armature 120 to the airbag module 110. Similarly, $K_{hs}$ represents a spring rate associated with a horn spring 150 (which may comprise, for example, one or more springs and related connectors for operation of a horn). And $K_d$ represents a spring rate associated with one or more dampening members 160 directly coupled to the airbag module 110.

If $K_{fw}+K_{hs}$ is relatively high or, in other words, if one or both of these spring rates are relatively high/stiff, it will be difficult to tune the overall frequency of the assembly using $K_d$. This may also be true for assemblies in which dampening member(s) 160 is positioned in between an interface between airbag module 110 and steering wheel armature 120, such as an intermediate member/plate (described in greater detail below). Thus, certain preferred embodiments of the invention described herein may be configured to isolate the dampening members 160 (again, represented by $K_d$) from one or both of the airbag module 110 and the horn spring 150 and/or horn functionality (again, represented by $K_{hs}$).

Figure 2:
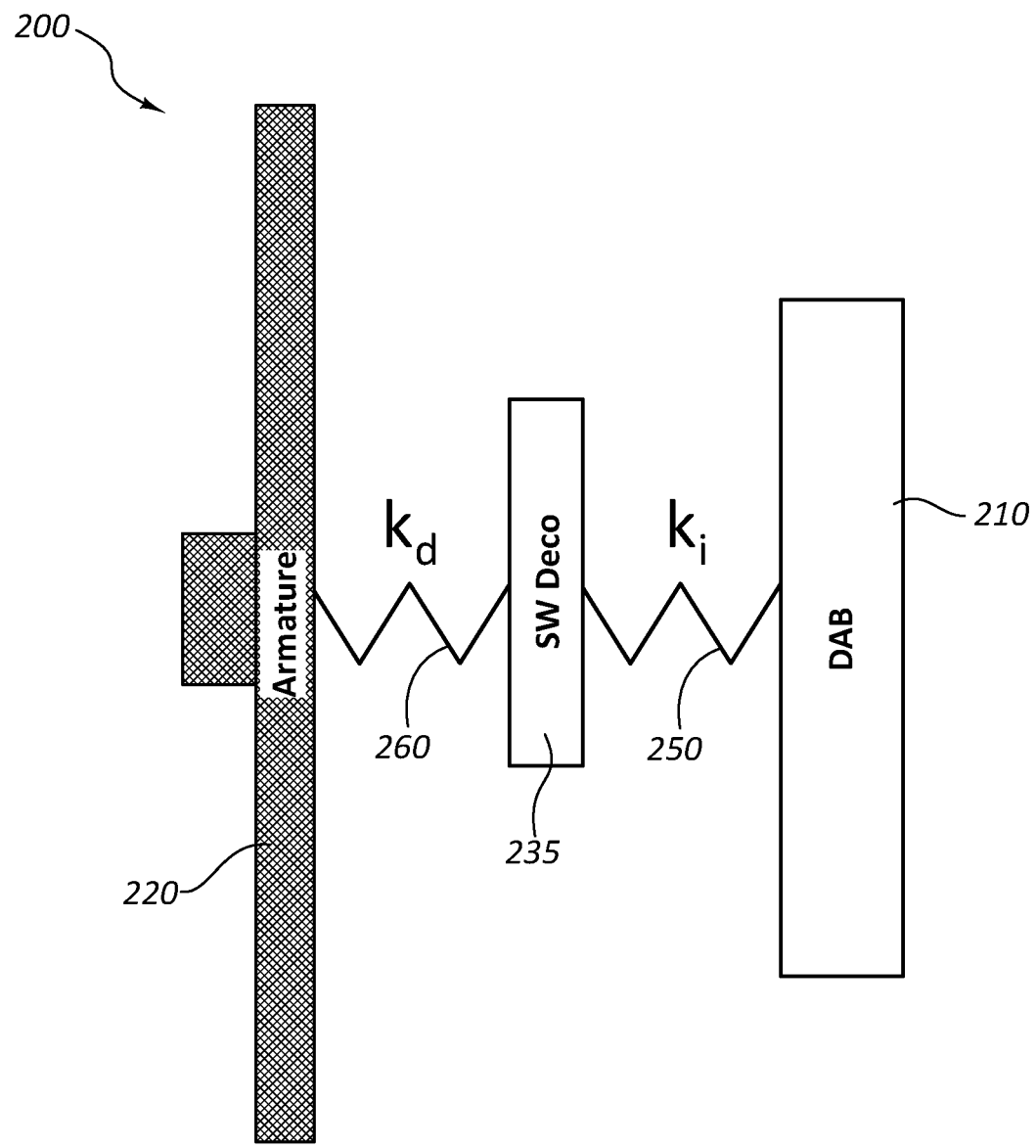
FIG. 2 is a schematic diagram illustrating another example of a driver airbag assembly according to other embodiments.

A schematic representation of such an embodiment is illustrated in FIG. 2. The driver airbag assembly 200 of FIG. 2 comprises an airbag module 210, a steering wheel armature 220, and an intermediate member 235, which may comprise an intermediate plate, positioned in between the airbag module 210 and the steering wheel armature 220. In addition, as shown schematically by springs in FIG. 2, rather than placing one or more dampening members 260 in between airbag module 210 and intermediate member 235, such dampening members 260 are positioned in between steering wheel armature 220 and intermediate member 235, thereby isolating the resulting effective spring rate $K_d$ from the effective spring rate $K_i$ of the various components between intermediate member 235 and airbag module 210, such as, for example, the horn spring 250 and/or horn functionality.

Figure 3:
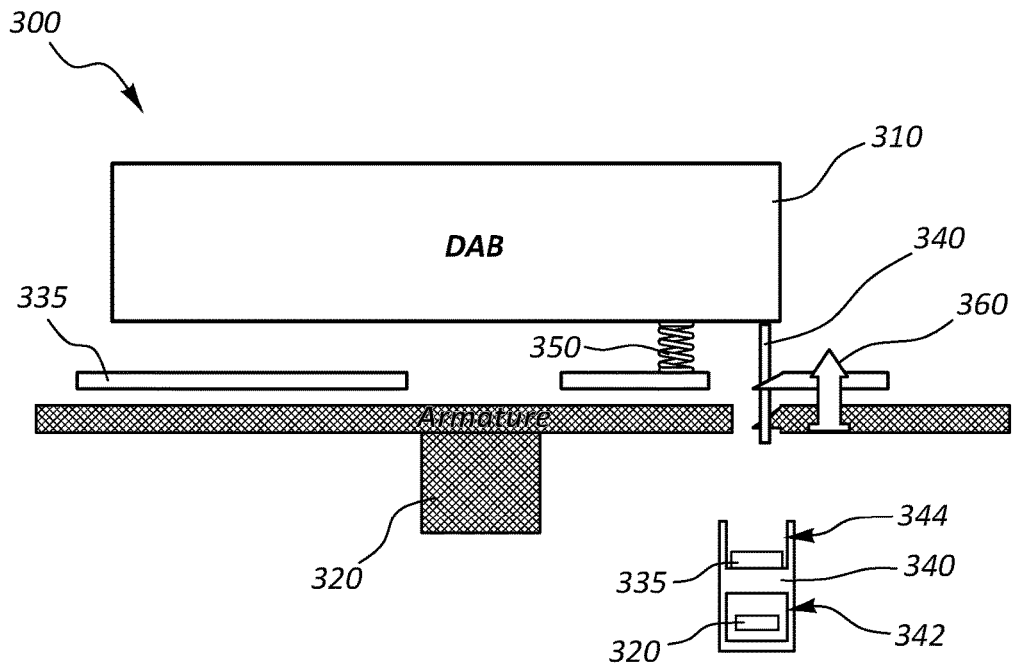
FIG. 3 is a schematic diagram illustrating yet another example of a driver airbag assembly according to other embodiments.

Another exemplary embodiment with additional detail is depicted in the schematic diagram of FIG. 3. As shown in this figure, driver airbag assembly 300 comprises an airbag module 310, a steering wheel armature 320, and an intermediate member 335, which, again, may comprise an intermediate plate, positioned in between the airbag module 310 and the steering wheel armature 320. In addition, a dampening member 360 is positioned in between intermediate member 335 and steering wheel armature 320. It should be understood that, although only a single dampening member 360 is depicted in FIG. 3, preferably a plurality of dampening members are positioned in between intermediate member 335 and steering wheel armature 320. For example, as described below in connection with other embodiments, in some embodiments, a plurality of dampening members 360 may be positioned about a periphery of steering wheel armature 320, preferably evenly or at least substantially evenly, such as in respective corners or corner regions of a base of steering wheel armature 320.

As also depicted in FIG. 3, one or more coupling members 340 may be used to facilitate coupling of intermediate member 335 and steering wheel armature 320. In some embodiments, such coupling member(s) may be used to couple both the intermediate member 335 and steering wheel armature 320 to the airbag module 310. Preferably, and as discussed in greater detail below, coupling member(s) 340 comprise a flexible material, and may define one or more windows for receipt of various elements therethrough to facilitate the aforementioned coupling(s). In some embodiments, coupling member(s) 340 may be configured to provide a non-rigid coupling. For example, unlike a screw, coupling member(s) 340 may be configured to provide play or space to allow for limited vibration/movement between the various elements for which it couples.

In the embodiment of FIG. 3, coupling member 340 comprises two windows, namely, a bottom window 342, which is configured to receive a projecting member or portion of armature 320, and a top window 344, which is configured to receive a projecting member or portion of intermediate member/plate 335. As also shown in FIG. 3, preferably intermediate member 335 and steering wheel armature 320 both comprise openings that at least partially overlap with one another so that coupling member 340 can extend through intermediate member 335 and steering wheel armature 320 to allow for receipt of these projecting members and/or portions of such elements.

The secondary portion of FIG. 3 depicts a rotated view of the interface between coupling member 340, intermediate member/plate 335, and steering wheel armature 320 and better depicts windows 342 and 344. The top portion of coupling member 340 may comprise two opposing prongs or fingers that may be coupled with airbag module 310. Alternatively, as described below, the top portion of the coupling member may define a surface, such as a surface extending between the two prongs/fingers, which surface may be configured to engage a hook, projecting member, or another suitable feature of airbag module 310.

Preferably, each of the windows comprises at least one surface upon which a hook or another projecting member, or another suitable component, may be engaged. In some embodiments, one or more of the windows (in some embodiments, each of the windows), may have both a lower surface and an upper surface such that whatever component is received within the window has an upper boundary and a lower boundary. In some embodiments, one of the boundaries may be provided by another element of the assembly. In some embodiments, each of the windows may have vertical "play" or spacing between the upper and lower surfaces/boundaries so that the components received therein may be allowed to move to accommodate, for example, horn movement, vibrations, etc.

Assembly 300 further comprises a horn spring 350 (again, multiple horn springs, connectors, and/or related elements used to provide horn functionality may be included but have been omitted for the sake of simplicity). As previously mentioned, it may be preferable for some embodiments to separate the horn springs and/or horn functionality from the dampening member(s) 360 in order to facilitate, for example, desired frequency tuning.

Figure 4:
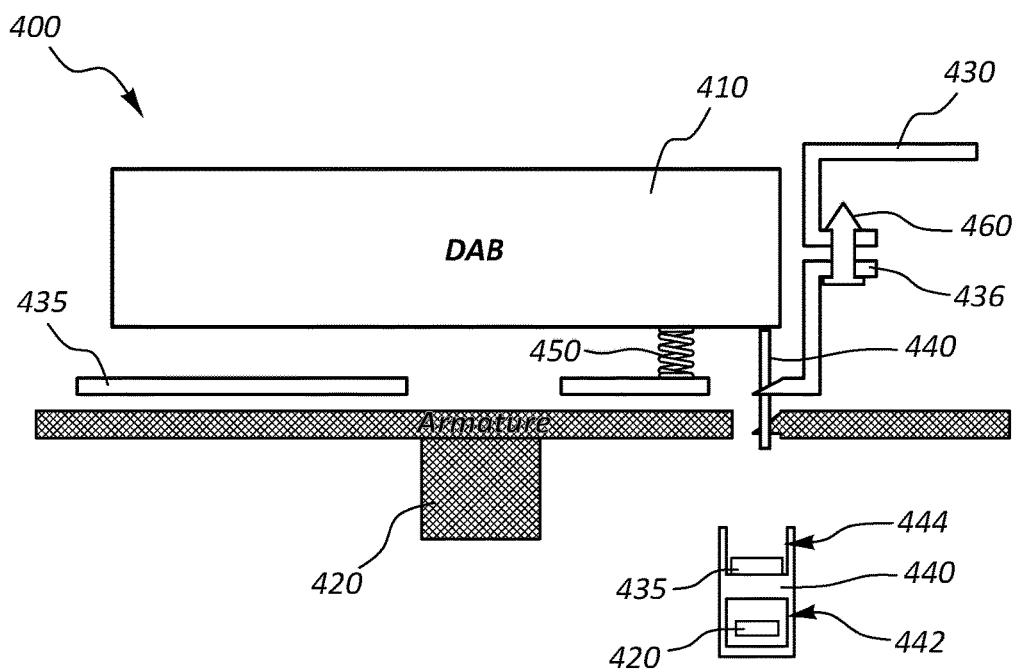
FIG. 4 is a schematic diagram illustrating still another example of a driver airbag assembly according to other embodiments.

FIG. 4 depicts yet another driver airbag assembly 400 according to other embodiments. Assembly 400 comprises an airbag module 410, a steering wheel armature 420, and an intermediate member 435 positioned in between the airbag module 410 and the steering wheel armature 420. However, assembly 400 further comprises a decorative member 430 and the dampening member(s) 460 are coupled between the intermediate member 435 and the decorative member 430. More particularly, dampening member(s) 460 are coupled between a lateral portion 436 of intermediate member 435 that projects laterally of airbag module 410 and decorative member 430. As also shown in this figure, a horn spring 450 and/or horn spring assembly is directly coupled between intermediate member 435 and airbag module 410. Again, by decoupling horn spring 450 from dampening member(s) 460, the ability to optimize/tune the frequency of the assembly 400 by way of dampening member(s) 460 may be improved.

In addition, similar to assembly 300, assembly 400 comprises one or more coupling members 440 (preferably flexible coupling members). Coupling member(s) 440 define one or more windows for receipt of various elements therethrough to facilitate desired coupling between two or more of the various elements of the assembly 400. Thus, coupling member 440 comprises a bottom window 442 configured to receive a projecting member or portion of armature 420, and a top window 444 configured to receive a projecting member or portion of intermediate member/plate 435. Preferably, intermediate member 435 and steering wheel armature 420 both comprise openings that at least partially overlap with one another, as previously described.

Figure 5:
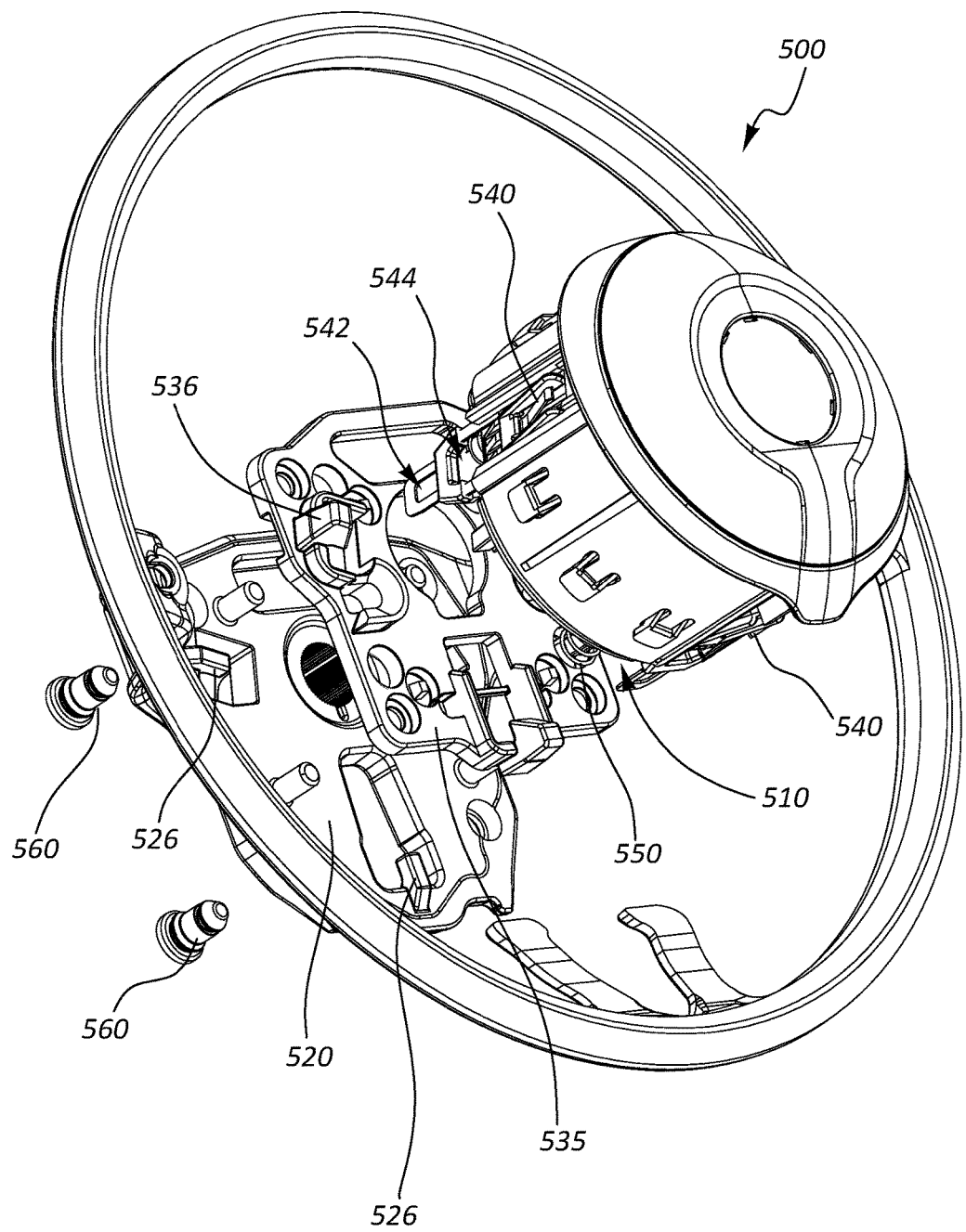
FIG. 5 is an exploded, perspective view of another embodiment of a driver airbag assembly.
Figure 6:
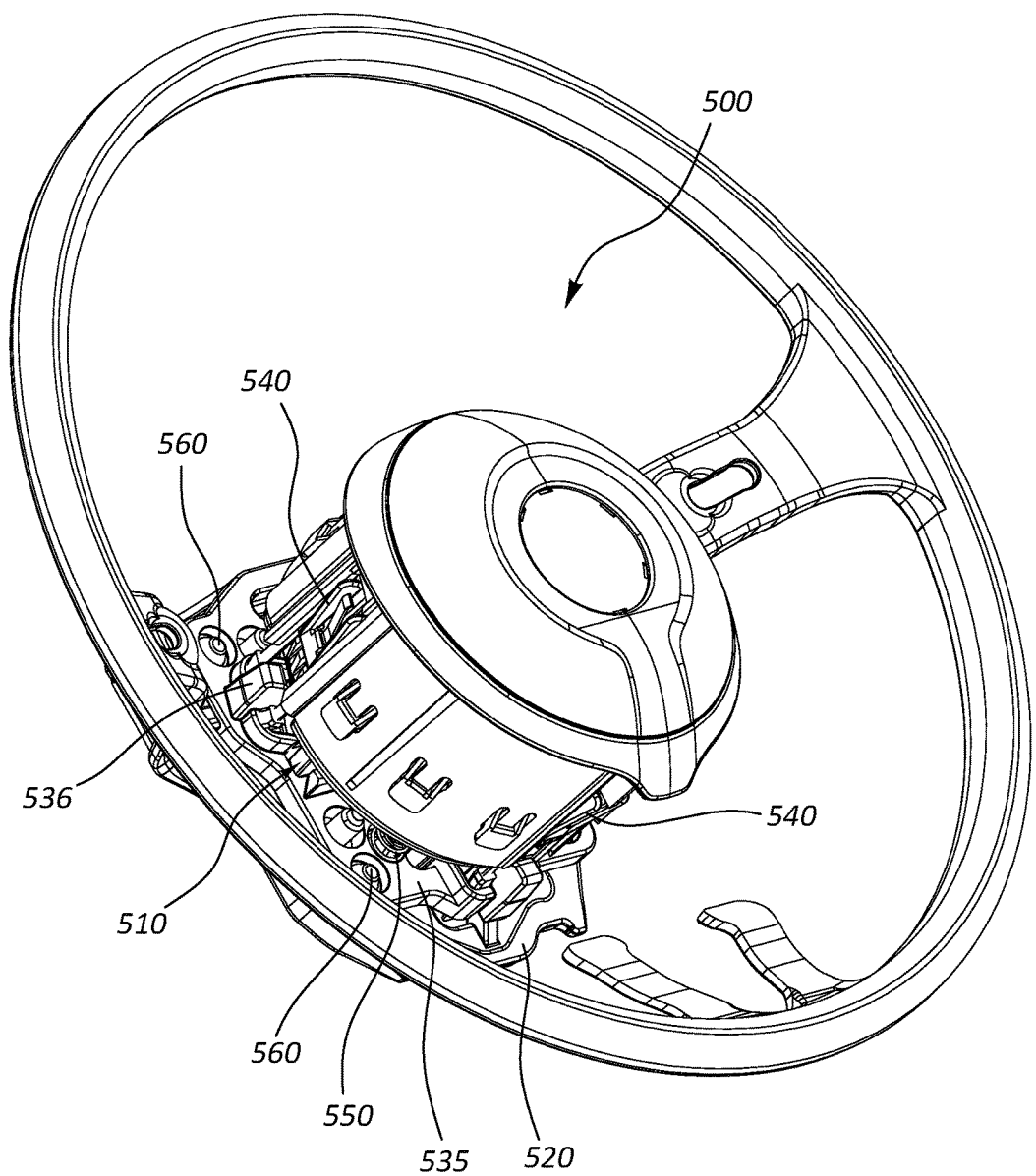
FIG. 6 is a perspective view of the embodiment of FIG. 5 in a fully-assembled configuration.

FIGS. 5 and 6 depict still another driver airbag assembly 500 according to some embodiments. FIG. 5 is an exploded, perspective view of assembly 500 and FIG. 6 depicts a fully-assembled perspective view of assembly 500. As shown in these figures, assembly 500 comprises an airbag module 510, a steering wheel armature 520, and an intermediate member comprising an intermediate plate 535 positioned in between the airbag module 510 and the steering wheel armature 520.

Assembly 500 further comprises a plurality of dampening members 560 directly coupled to intermediate plate 535 and steering wheel armature 520. More particularly, the embodiment of FIGS. 5 and 6 comprises four dampening members 560 extending through respective openings formed in armature 520 and similar respective openings formed in intermediate plate 535. Dampening members 560 are positioned about the periphery of both armature 520 and intermediate plate 535 adjacent to respective corners of both armature 520 and intermediate plate 535. Dampening members 560 preferably comprise a resilient, flexible material configured to dampen vibrations such as, for example, rubber, silicone, plastic, or another elastomer. Although the embodiments depicted herein show dampening members 560 as having an at least substantially circular cross-sectional shape, other embodiments are contemplated in which the shape may differ. This may allow for frequency/vibration tuning that differs by direction.

A horn spring 550 and/or other components making up a horn spring assembly is directly coupled between intermediate plate 535 and airbag module 510. Thus, horn spring 550 is decoupled and/or positioned at a distinct/separate coupling "level" relative to dampening members 560. In addition, in the depicted embodiment, dampening members 560 are not directly coupled to airbag module 510, which may also have certain benefits associated with dampening frequency tuning.

Assembly 500 further comprises a plurality of coupling members 540 (preferably flexible coupling members) configured to directly couple with intermediate plate 535 and with airbag module 510. More particularly, the depicted embodiment comprises three flexible coupling members 540 evenly spaced apart along the periphery of intermediate plate 535 and airbag module 510. Coupling members 540 comprise double-window coupling members. In other words, each of coupling members 540 defines an upper window 544 configured to receive respective projecting members, which in the depicted embodiment comprise hooks 536, positioned on intermediate plate 535. Similarly, each of coupling members 540 also defines a lower window 542. Lower window 542 is configured to receive similar projecting members 526 formed in steering wheel armature 520. Such projecting members 526 may, in some embodiments, also comprise hooks. Also, intermediate plate 535 and steering wheel armature 520 both comprise respective openings that at least partially overlap with one another, as previously described. Preferably, the number of such openings correspond with the number of coupling members 540 such that the coupling members 540 may at least partially extend through both sets of openings. Openings 538 in intermediate plate 535 can be seen more clearly in FIG. 7A.

Figure 7A:
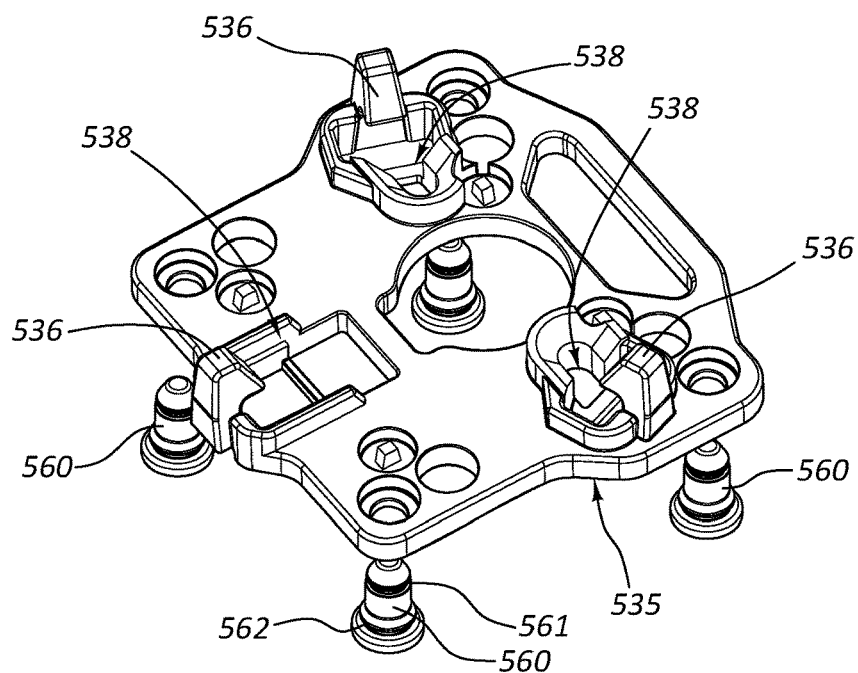
FIG. 7A is an exploded, perspective view of the intermediate plate and dampening members of the embodiment of FIGS. 5 and 6.
Figure 7B:
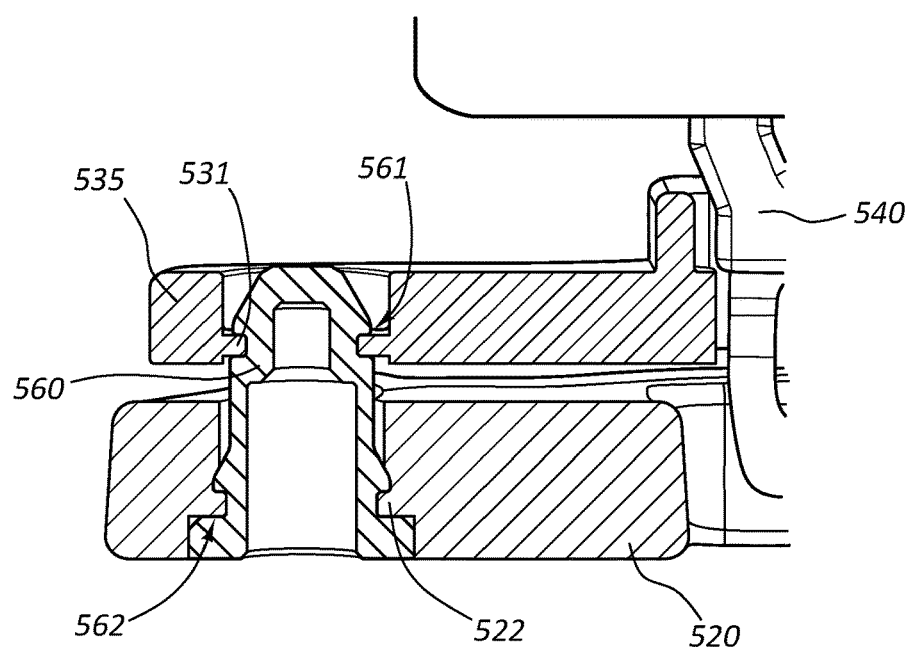
FIG. 7B is a partial, cross-sectional view of the embodiment of FIGS. 5 and 6.

FIG. 7A depicts an exploded view of intermediate plate 535 with a plurality of dampening members 560 and FIG. 7B is a cross-sectional view depicting dampening members 560 extending through both intermediate plate 535 and steering wheel armature 520. As better seen in this figure, plate 535 comprises four openings configured to receive each of the four dampening members 560. Each of dampening members 560 comprises an intermediate plate radial groove 561 and an armature radial groove 562. Intermediate plate radial groove 561 is configured to receive a corresponding radial protrusion 531 formed in each respective opening formed in intermediate plate 535 and, similarly, armature radial groove 562 is configured to receive a corresponding radial protrusion 522 formed in each respective opening of armature 520, as depicted in the cross-sectional view of FIG. 7B. Dampening members 560 may also comprise a "dart" shape having a widened base and a narrowed tip such that they may be inserted within the aforementioned openings by inserting them from the lower surface of the armature 520, through the armature opening, and then through the intermediate plate openings to snap lock them into place.

As also best seen in FIG. 7A, intermediate plate 535 comprises a plurality of openings 538 that correspond in number with the number of flexible coupling members 540 such that each of the flexible coupling members 540 at least partially extends through one of the openings 538. Similarly, and as better shown in other figures, preferably armature 520 has a corresponding set of openings that align, or at least partially align, with openings 538 such that each flexible coupling member 540 can extend through these openings in armature 520 as well.

Figure 8A:
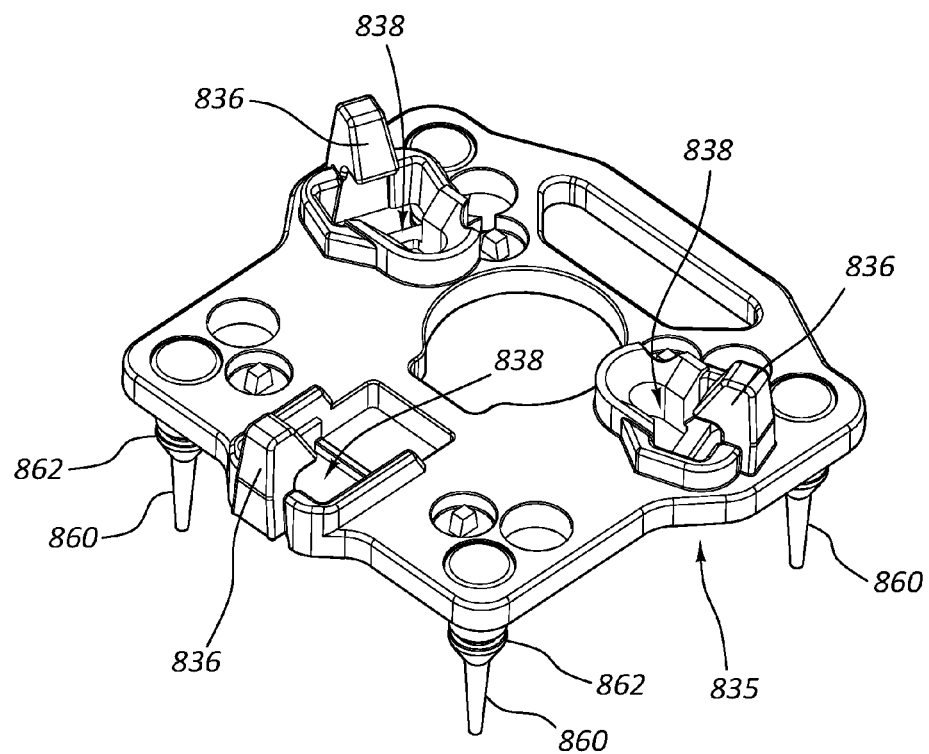
FIG. 8A is a perspective view of an intermediate plate and dampening members that may be used in alternative embodiments of driver airbag assemblies.
Figure 8B:
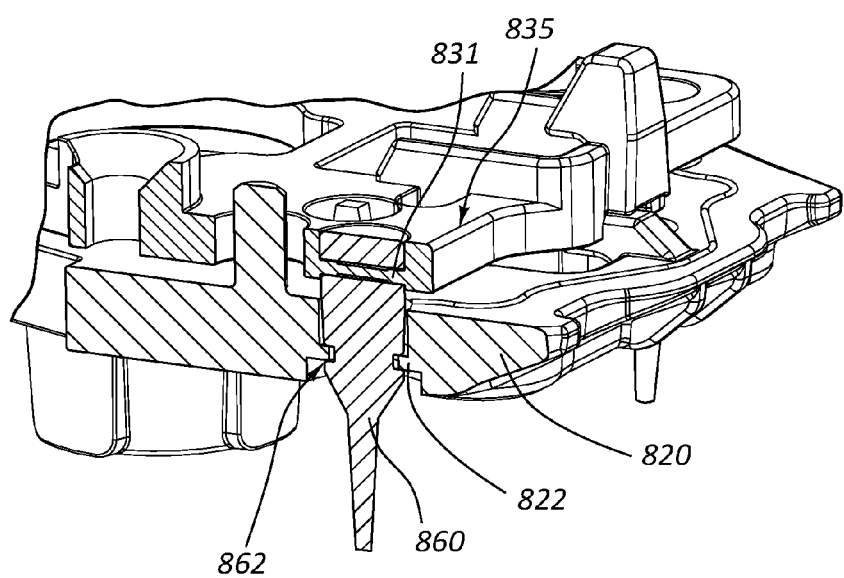
FIG. 8B is a partial, cross-sectional view of the intermediate plate and dampening members of FIG. 8A coupled with a steering wheel armature.

FIGS. 8A and 8B depict an alternative intermediate plate 835, alternative dampening members 860, and an alternative steering wheel armature 820 according to other embodiments. FIG. 8A is a perspective view of intermediate plate 835 with a plurality of dampening members 860 comprising elongated legs and FIG. 8B is a cross-sectional view depicting dampening members 860 extending through both intermediate plate 835 and steering wheel armature 820. Plate 835 again comprises four openings configured to receive each of the four dampening members 860. Each of dampening members 860 comprises an armature radial groove 862 configured to receive a corresponding radial protrusion 822 formed in each respective opening of armature 820, as depicted in the cross-sectional view of FIG. 8B.

Dampening members 860 may also have a widened base and a narrowed tip that may be formed in a series of steps rather than a tapered outer sidewall. However, unlike dampening members 560, dampening members 860 have a narrowed bottom end and a widened top end such that they may be inserted within the aforementioned openings by inserting them from the upper surface of the intermediate plate 835, through the intermediate plate openings, and then through the armature openings to snap lock them into place. In some embodiments and implementations, dampening members 860 may be overmolded directly onto the intermediate plate 835 and then inserted through openings in the steering wheel armature 820, as shown in FIG. 8B.

Dampening members 860 and dampening members 560 are examples of means for dampening steering wheel vibrations, or "dampening means," along with each of the other dampening members disclosed herein.

Thus, rather than providing a radial groove 561 configured to receive a corresponding radial protrusion 531, as depicted in FIGS. 7A and 7B, a cross-member 831 may be provided in the openings of intermediate plate 835 that are configured to receive the dampening members 860. In some embodiments, the cross-members 831 may extend all of the way across each such opening. Alternatively, the cross-members 831 may only extend partially across each such opening. Cross-members 831 may provide stability and/or a place for mechanical locking to allow for overmolding the dampening members 860 to the intermediate plate 835.

As also best seen in FIG. 8A, intermediate plate 835 again comprises a plurality of openings 838 that correspond in number with the number of flexible coupling members (not shown) such that each of the flexible coupling members at least partially extends through one of the openings 838. Preferably, armature 820 has a similar corresponding set of openings that align, or at least partially align, with openings 838 such that each flexible coupling member can extend through these openings in armature 820 as well.

Figure 9:
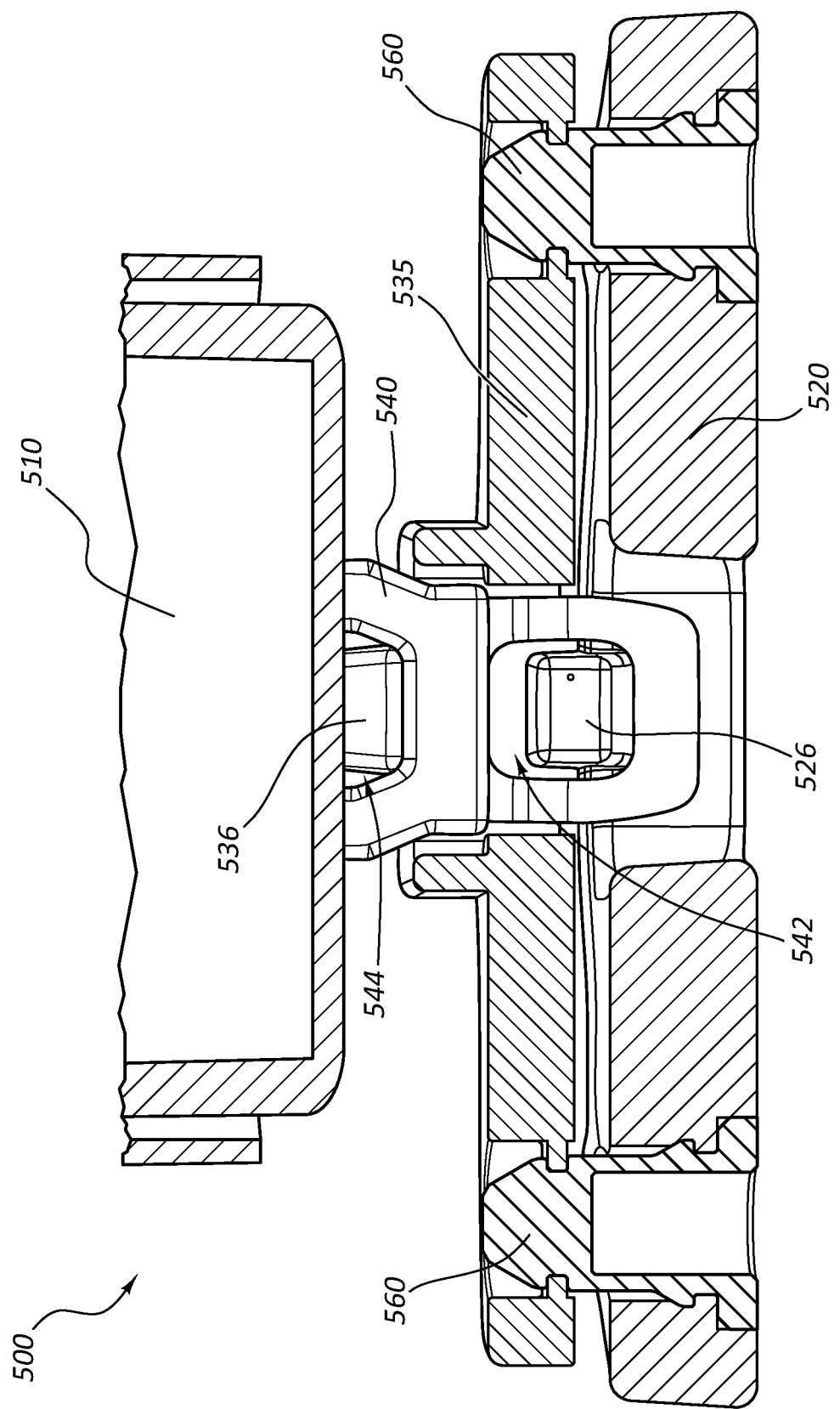
FIG. 9 is a cross-sectional view of the embodiment of FIGS. 5 and 6.

FIG. 9 is a cross-sectional view of assembly 500 that better depicts how flexible coupling member 540 is used to couple the various components of assembly 500 together. More particularly, armature 520 may comprise a plurality of projecting members 526, which may comprise hooks. Projecting members 526 may extend from an opening formed in armature 520 and through lower opening or window 542 of flexible coupling member 540. Similarly, as previously mentioned, other projecting members 536, which, again, may comprise hooks, may extend from an opening formed in intermediate plate 535 and through upper opening or window 544 of flexible couple member 540. Although not clearly evident from FIG. 9, flexible coupling members 540 may also extend into or otherwise couple with airbag module 510, such as by way of flexible arms that extend from flexible coupling members 540.

It may be preferable to form one or more of the flexible coupling members 540 such that the two openings/windows have different sizes/widths, such that one or more of the projecting members have different sizes/widths, and/or one of the openings/windows may have a width that is smaller than the projecting member/hook of the opposite/wrong element in the assembly. This may be useful in guiding assembly/installation and, more particularly, avoiding improper assembly/installation. For example, in some embodiments, lower window 542 of one or more of the flexible coupling members 540 may have a width that is less than the width of one or more of intermediate plate projecting members 536 such that lower window 542 cannot be inadvertently coupled with projecting member 536 rather than projecting member 526 of armature 520. Lower window 542 may therefore have a width that is less than the corresponding width of upper window 544, and hook 526 may have a width that is less than the corresponding width of hook 536 in order to prevent improper assembly.

Figure 10:
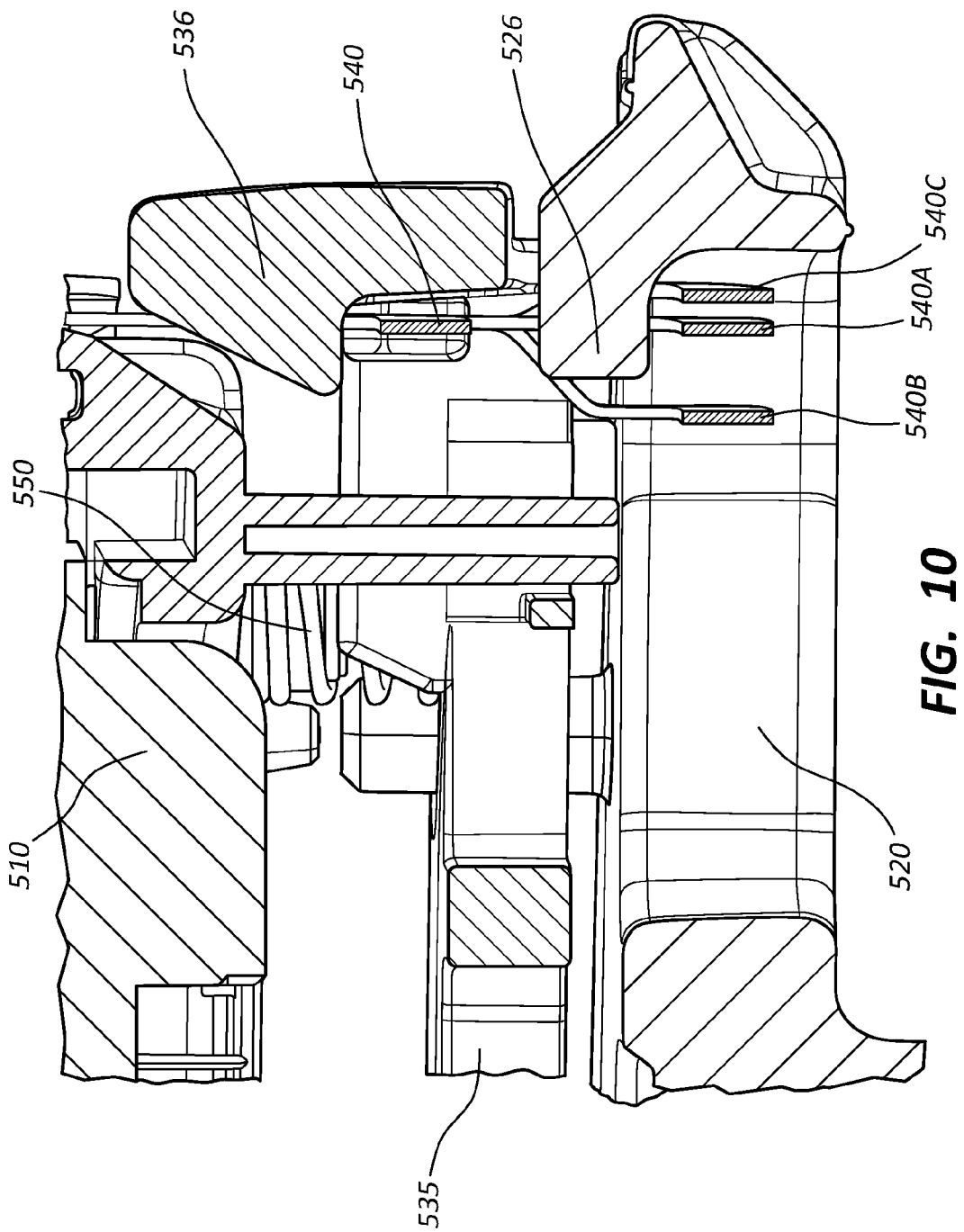
FIG. 10 is a partial, cross-sectional view of the embodiment of FIGS. 5 and 6 depicting three alternative configurations for the coupling member.

FIG. 10 is another cross-sectional view of assembly 500 that depicts three alternative configurations for the coupling member(s) 540. More particularly, coupling member 540A comprises a straight lower portion defining an opening/window for receipt of a hook 526, another projecting member, or another suitable portion of steering wheel armature 520. Coupling member 540B comprises a lower portion that extends inwards away from the outer periphery of armature 520 (to the left from the perspective of FIG. 10). And coupling member 540C comprises a lower portion that extends towards the outer periphery of armature 520 (to the right from the perspective of FIG. 10). Projecting the lower portion of coupling member 540 in one direction or the other may be preferable for certain reasons, such as facilitating assembly, improving ease of uninstallation, preventing false/improper installation, and/or providing a more secure coupling between airbag module 510, intermediate plate 535, and armature 520.

Figure 11A:
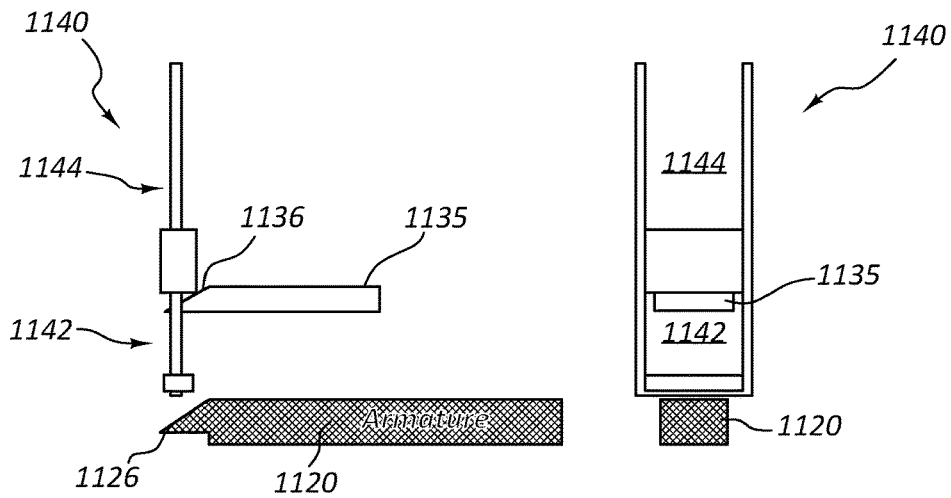
FIGS. 11A-11C depict schematically various stages during a method for assembly of a driver airbag assembly according to some implementations.
Figure 11B:
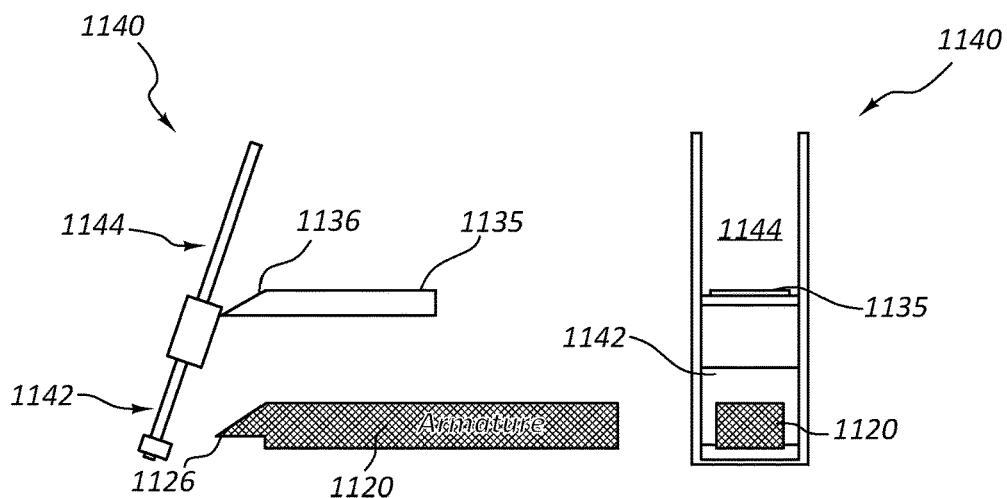
Figure 11C:
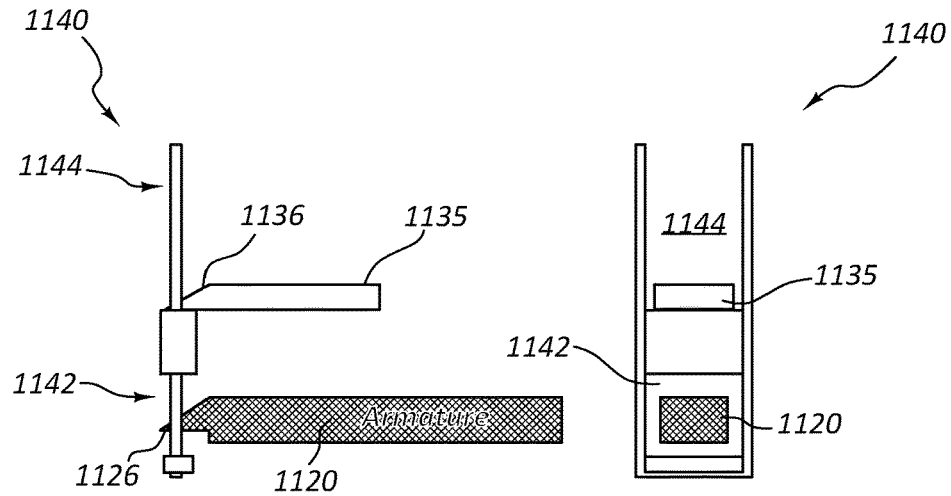

FIGS. 11A-11C depict various features associated with certain embodiments that may further improve installation, uninstallation, and/or a desired coupling between two or more of the various components of the assembly. FIG. 11A depicts a coupling member 1140 comprising a lower opening or window 1142 and an upper opening or window 1144 during an initial step during a method for installation/assembly. As shown in this figure, projecting member 1136 of intermediate plate 1135 may initially be received within lower opening 1142 of coupling member 1140. However, by making projecting member 1136 ramped on its upper surface (and/or by ramping a corresponding surface on coupling member 1140), coupling member 1140 may be pushed off of projecting member 1136, as depicted in FIG. 11B, and then projecting member 1126 may be received within lower opening 1142 and projecting member 1136 may be received within upper opening 1144, as depicted in FIG. 11C. One or both of projecting members 1126 and 1136, and/or one or both of openings 1142 and 1144, may be sized and/or shaped to facilitate receipt in only its desired location, if desired, in order to prevent misassembly.

Figure 12A:
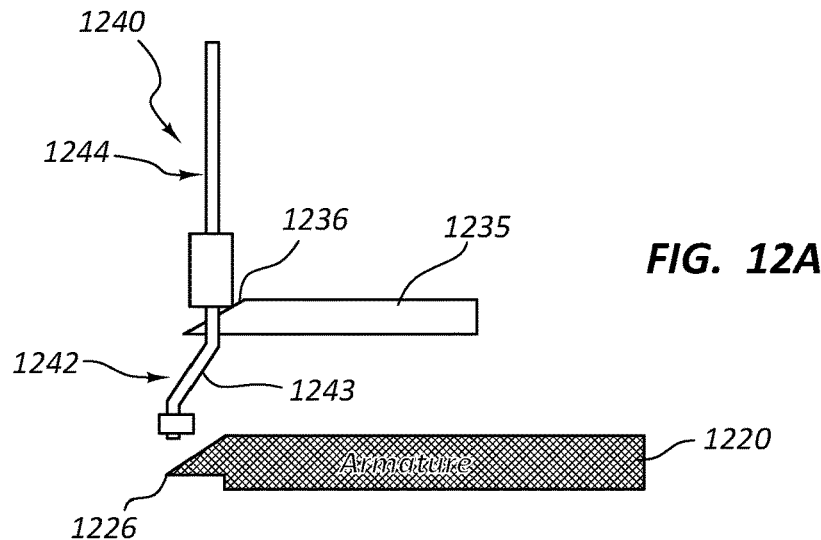
FIGS. 12A-12C depict schematically an alternative embodiment of a driver airbag assembly in various stages during a method for assembly according to other implementations.
Figure 12B:
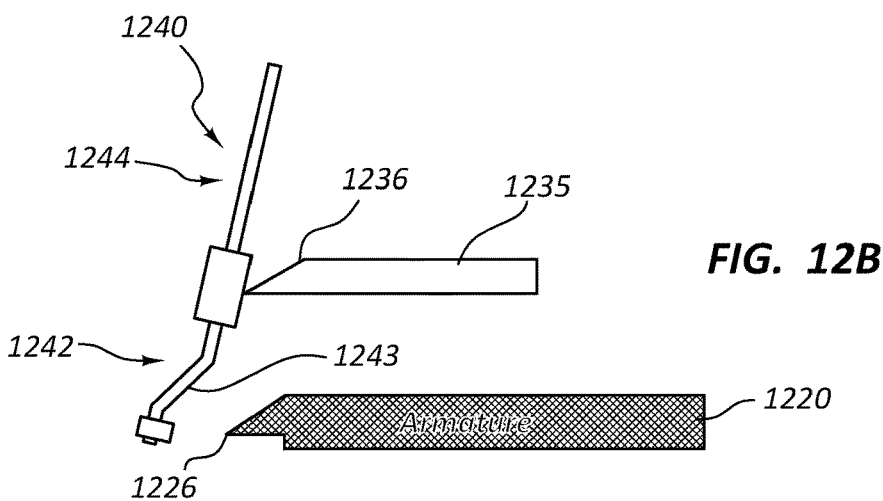
Figure 12C:
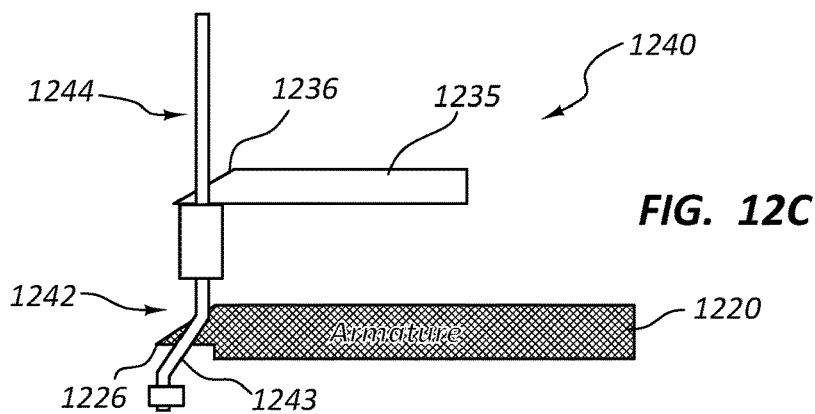

Similarly, FIGS. 12A-12C depict various features associated with other embodiments that may, again, improve installation, uninstallation, and/or a desired coupling between two or more of the various components of the assembly. FIG. 12A depicts a coupling member 1240 comprising a lower opening or window 1242 and an upper opening or window 1244 during an initial step during a method for installation/assembly. However, unlike coupling member 1140, coupling member 1240 comprises an angled lower portion 1243 that may inhibit improper installation. More particularly, angled portion 1243 may prevent, or at least reduce the possibility, of projecting member 1236 of intermediate plate 1235 from engaging lower opening 1242 rather than upper opening 1244. As shown in FIG. 12A, projecting member 1236 of intermediate plate 1235 may still initially be at least partially received within lower opening 1242 of coupling member 1240. However, by making angled portion 1243 project away from projecting members 1236 and 1226, and/or by making projecting member 1236 ramped, as previously discussed, coupling member 1240 may be configured so as to be pushed off of projecting member 1236 and/or such that projecting member 1236 will not fully engage with lower opening 1242. Thus, as depicted in FIGS. 12B and 12C, projecting member 1226 may then be received within lower opening 1242 and projecting member 1236 may be received within upper opening 1244. Again, one or both of projecting members 1226 and 1236, and/or one or both of openings 1242 and 1244, may be sized and/or shaped to facilitate receipt in only its desired location, if desired, in order to prevent misassembly.

Moreover, as depicted in each of FIGS. 12A-12C, projecting member 1226 may be misaligned with respect to projecting member 1236 to further facilitate proper engagement. More particularly, projecting member 1226 may extend further than projecting member 1236, which, in combination with angled portion 1243, may prevent or inhibit coupling of projecting member 1236 with opening 1242 and guide/facilitate proper engagement between projecting member 1226 and opening 1242.

Figure 13A:
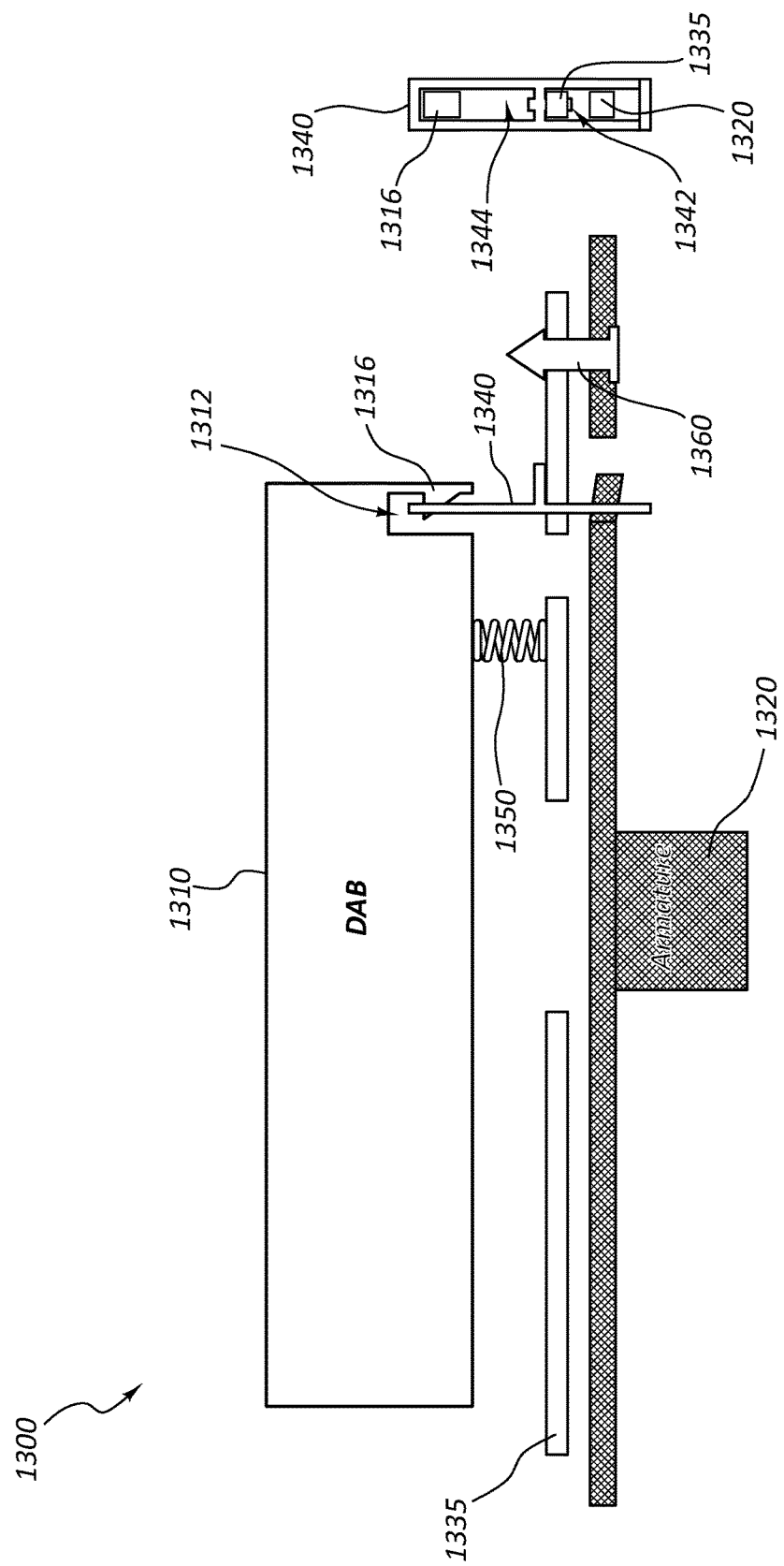
FIG. 13A is a schematic diagram illustrating still another example of a driver airbag assembly according to other embodiments.
Figure 13B:
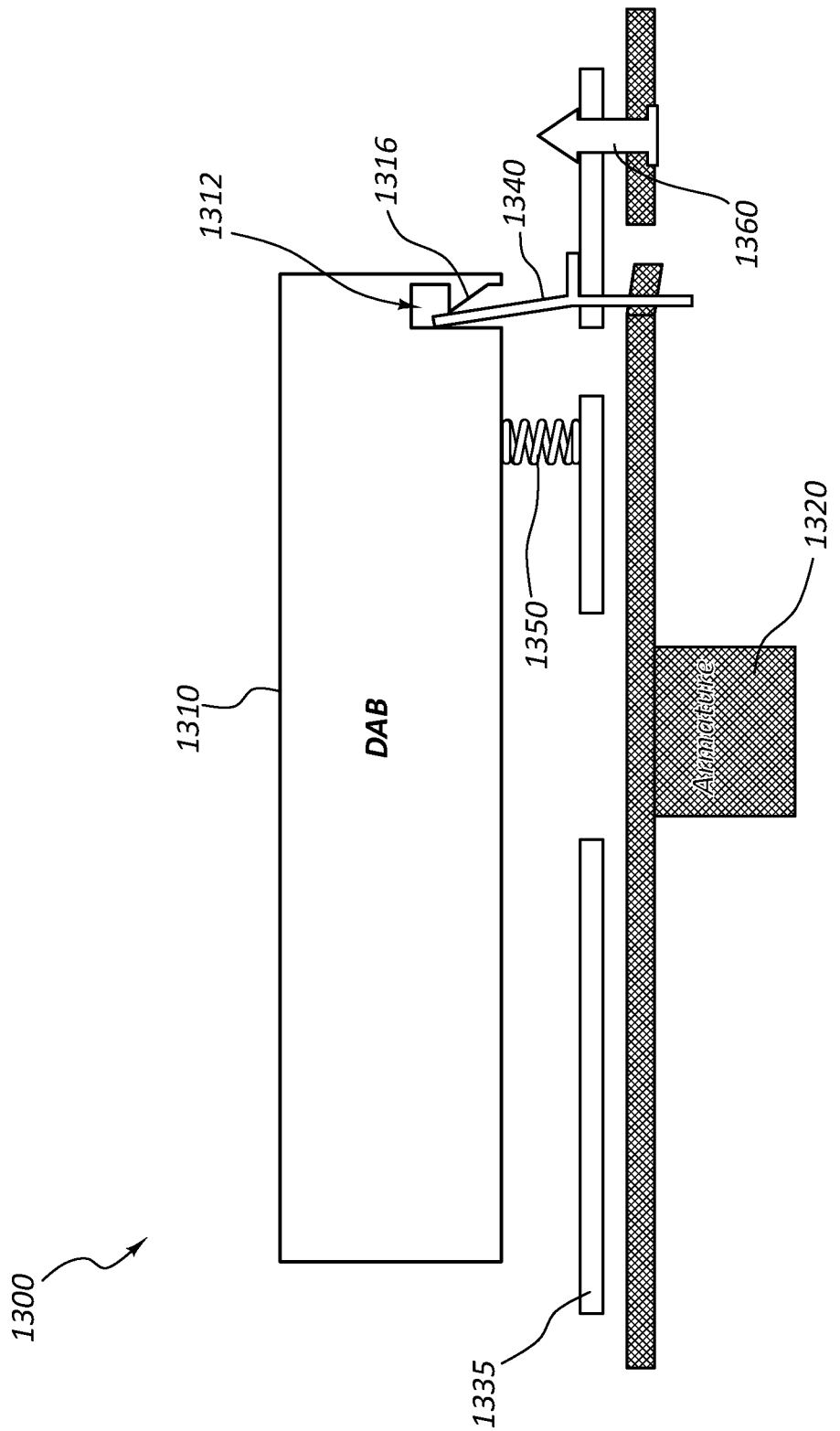
FIG. 13B depicts the embodiment of FIG. 13A during a stage of assembly or disassembly.

FIGS. 13A and 13B depict yet another driver airbag assembly 1300 according to still other embodiments. FIG. 13A depicts assembly 1300 in a fully assembled state and FIG. 13B depicts assembly 1300 in a stage either immediately prior to full assembly or an initial stage of disassembly/uninstallation. Assembly 1300 comprises an airbag module 1310, a steering wheel armature 1320, and an intermediate member 1335 positioned in between the airbag module 1310 and the steering wheel armature 1320. Assembly 1300 further comprises one or more dampening members 1360 coupled between the intermediate member 1335 and the steering wheel armature 1320. In addition, assembly 1300 further comprises a horn spring 1350 and/or horn spring assembly that is directly coupled between intermediate member 1335 and airbag module 1310. Thus, horn spring 1350 and/or its associated functional assembly is decoupled from dampening member(s) 1360.

Like several of the previously described embodiments, assembly 1300 also comprises one or more coupling members 1340, which may comprise flexible coupling members. Again, coupling member(s) 1340 define one or more openings/windows for receipt of various elements therethrough to facilitate desired coupling between two or more of the various elements of the assembly 1300. Thus, coupling member 1340 comprises a bottom window 1342 configured to receive a projecting member or other portion of armature 1320, and a top window 1344 configured to receive a projecting member or other portion of intermediate member/plate 1335.

However, assembly 1300 differs from the previously-discussed embodiments in several ways. First, intermediate member 1335 and steering wheel armature 1320 do not comprise openings that at least partially overlap with one another, as previously described. In addition, coupling member 1340 extends into a recess 1312 formed within airbag module 1310 and is coupled with a projecting member 1316 of airbag module 1310. Again, projecting member 1316 may comprise a hook in some embodiments. Window 1344 may therefore be closed at its upper end so as to receive projecting member 1316 rather than defining two opposing flexible arms as in several of the previously-discussed embodiments.

Also, although coupling member 1340 comprises only two windows (the upper portion of the lower window 1342 engages intermediate member/plate 1335 and the lower portion of lower window 1342 engages armature 1320), alternative embodiments are contemplated in which three separate openings/windows may be provided by coupling member 1340. For example, a lower window may engage armature 1320, a middle window may engage intermediate member 1335, and an upper window may engage airbag module 1310.

As shown in FIG. 13B, the upper portion of coupling member 1340 may be flexible such that it is configured to bend away from projecting member 1316 to allow for decoupling of airbag module 1310. In some embodiments, the remainder of the coupling member 1340 may be rigidly affixed to the intermediate member/plate 1335 and the armature 1320. Alternatively, the coupling member 1340 may be removably coupled with intermediate member/plate 1335 and the armature 1320, as previously discussed.

Figure 14:
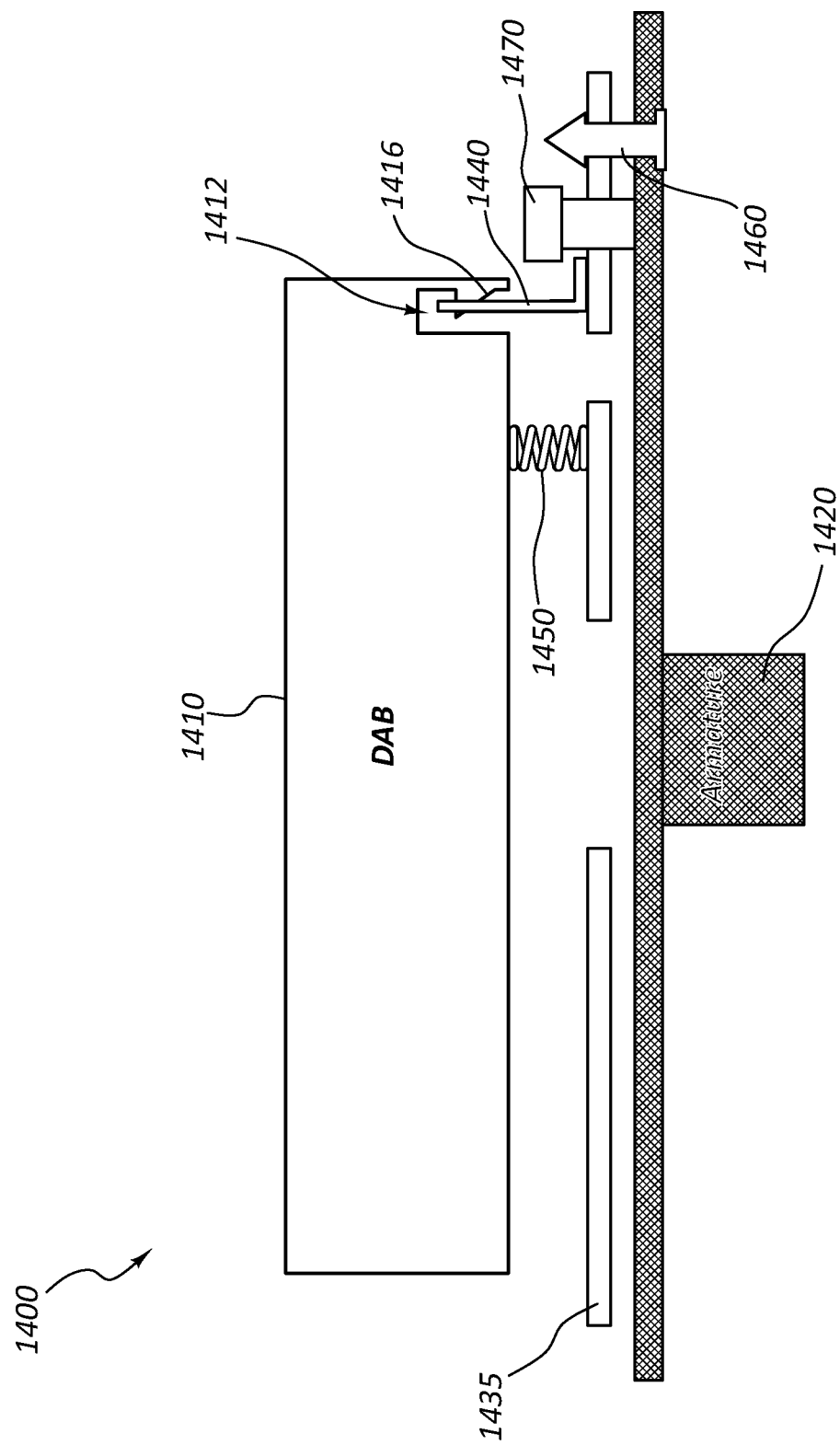
FIG. 14 is a schematic diagram illustrating another example of a driver airbag assembly according to still other embodiments.

FIG. 14 depicts still yet another driver airbag assembly 1400 according to other embodiments. Assembly 1400 again comprises an airbag module 1410, a steering wheel armature 1420, and an intermediate member 1435 positioned in between the airbag module 1410 and the steering wheel armature 1420. Assembly 1400 further comprises one or more dampening members 1460 coupled between the intermediate member 1435 and the armature 1420 and a horn spring 1450 and/or horn spring assembly that is directly coupled between intermediate member 1435 and airbag module 1410, as previously discussed. Thus, horn spring 1450 and/or its associated functional assembly is decoupled from dampening member(s) 1460.

Assembly 1400 also comprises one or more coupling members 1440, which may comprise flexible coupling members. However, coupling member(s) 1440 only define a single opening/window. The one opening/window of coupling member(s) 1440 is coupled with airbag module 1410 and, more particularly, extends into a recess 1412 of airbag module 1410 and is coupled with a projecting member 1416 of airbag module 1410. Coupling member 1440 may be rigidly affixed to intermediate member/plate 1435 at its opposite end, as shown in the figure. Because coupling member 1440 is not used to couple intermediate member/plate 1435 with steering wheel armature 1420 in this embodiment, one or more alternative fastening members 1470, such as shoulder bolts, pins, or the like, may be used instead. In preferred embodiments, fastening member(s) 1470 may, like coupling member 1440, provide a loose coupling so as to avoid interfering with the function of the dampening member(s) 1460.

Figure 15:
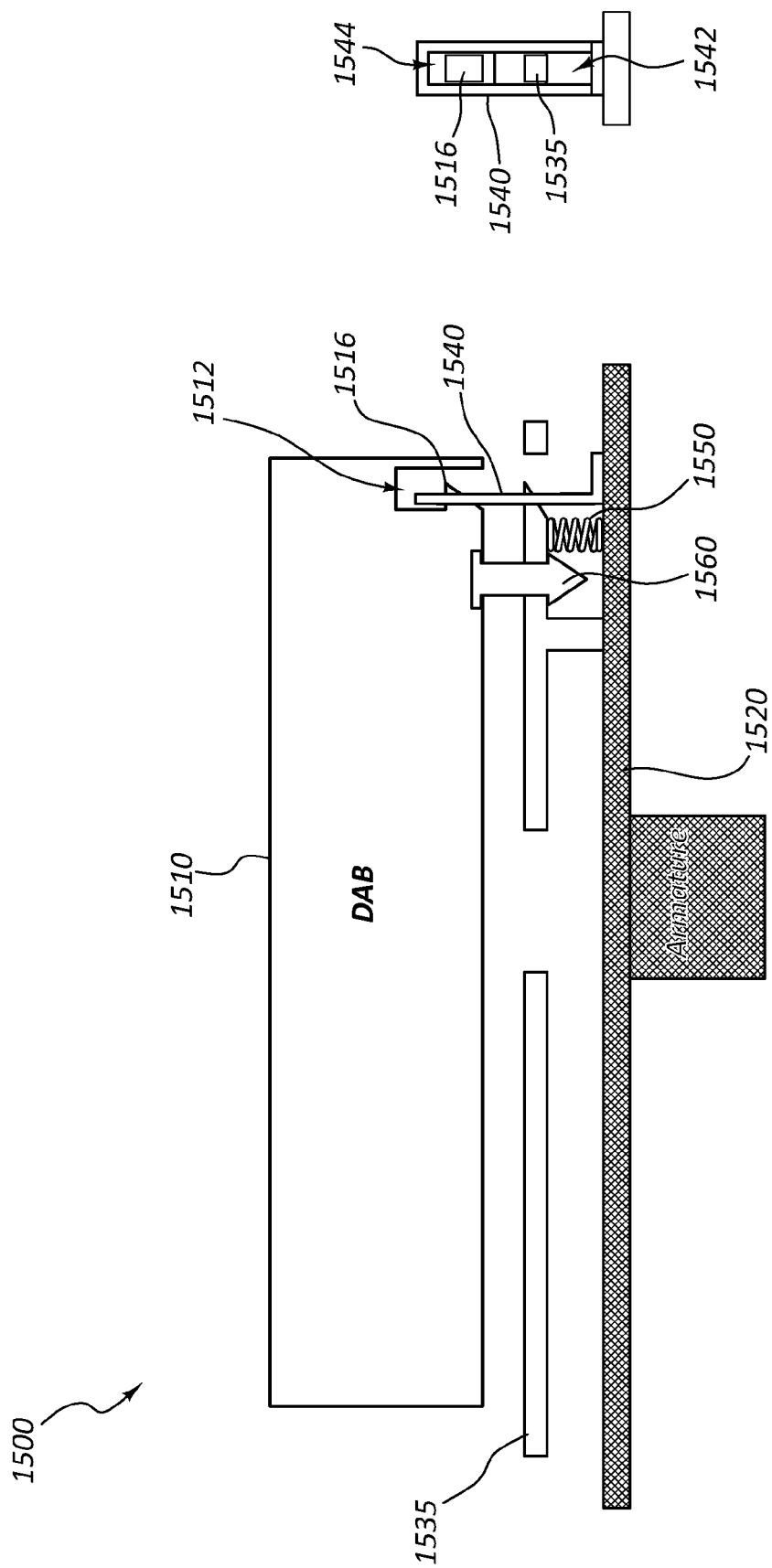
FIG. 15 is a schematic diagram illustrating still yet another example of a driver airbag assembly according to other embodiments.

Another example of a driver airbag assembly 1500 according to other embodiments is depicted in FIG. 15. Assembly 1500 again comprises an airbag module 1510, a steering wheel armature 1520, and an intermediate member 1535 positioned in between the airbag module 1510 and the steering wheel armature 1520. Assembly 1500 further comprises one or more dampening members 1560 and a horn spring 1550 and/or horn spring assembly. However, unlike previous embodiments, the horn spring 1550/horn spring assembly is positioned in between armature 1520 and intermediate member/plate 1535. Thus, in order to avoid positioning dampening member(s) 1560 at the same functional level as horn spring 1550/horn spring assembly and thereby functionally decoupling these two elements, dampening member(s) 1560 are positioned directly coupled between the intermediate member 1535 and the airbag module 1510.

Assembly 1500 is otherwise similar to previous embodiments. Thus, assembly 1500 comprises one or more coupling members 1540, which may comprise flexible coupling members, and may be used to couple, in some embodiments loosely couple, various elements together. In the depicted embodiment, coupling member(s) 1540 is used to couple airbag module 1510, intermediate member/plate 1535, and steering wheel armature 1520. More particularly, coupling member(s) 1540 is coupled with airbag module 1510 by way of recess 1512 and projecting member 1516 extending through upper opening/window 1544. Similarly, a projecting member or other portion of intermediate member/plate 1535 extends through lower opening/window 1542 and the lowermost portion of coupling member(s) 1540 is rigidly affixed to armature 1520, such as, for example, by overmolding, welding, or by screws, bolts, or other fasteners.

FIGS. 16A and 16B depict certain alternative features of another driver airbag assembly 1600 from upper and lower sides of a steering wheel armature 1620 of the assembly. Although only steering wheel armature 1620 of assembly 1600 is depicted in these figures, it should be understood that any of the other components previously discussed may be included in assembly 1600, as desired or needed. Armature 1620 comprises an opening 1628 that, as previously discussed, may be aligned with one or more other components, such as an opening in an airbag module and/or intermediate plate, for example. In addition, as discussed below, opening 1628 comprises various recesses and features used to receive a coupling member 1640. As previously discussed, although not depicted in FIGS. 16A and 16B, coupling member 1640 may be used to couple (in some cases, non-rigidly couple) armature 1620 to other elements of the assembly 1600.

Coupling member 1640 comprises a wire, and, preferably, a flexible wire. Coupling member/wire 1640 comprises a U-shaped window 1642, which is similar to the windows previously discussed. Window 1642 extends through a second opening 1629 formed in armature 1620.

In addition, coupling member 1640 comprises features configured to engage with corresponding features formed within opening 1628. More particularly, in the depicted embodiment, coupling member 1640 comprises opposing bends 1643A and 1643B that are configured to respectively engage opposing protrusions 1623A and 1623B formed in opening 1628 to secure coupling member 1640 to armature 1620. However, alternative embodiments are contemplated in which coupling member 1640 may instead be engaged with similar or other features formed in an intermediate plate or another element of assembly 1600.

Preferably, coupling member 1640 is sufficiently flexible, yet resiliently flexible, such that opposing sides of coupling member 1640 (such as at or near opposing bends 1643A and 1643B) may be pinched or otherwise forced towards one another to allow for entry into opening 1628, after which these opposing sides may expand and return to their natural state, engage protrusions 1623A and 1623B, and lock coupling member 1640 into place. This configuration may therefore serve as a snap-fit coupling means.

Figure 17B:
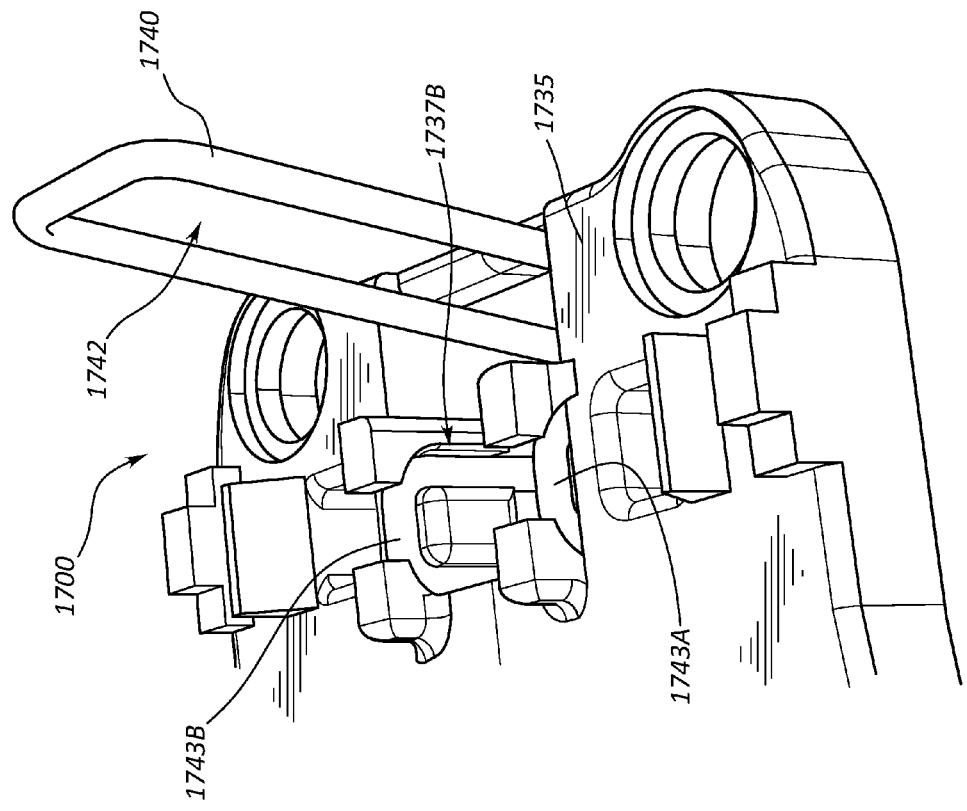
FIG. 17B is a perspective view of a portion of the driver airbag assembly of FIG. 17A taken from a second side opposite the first side.
Figure 17A:
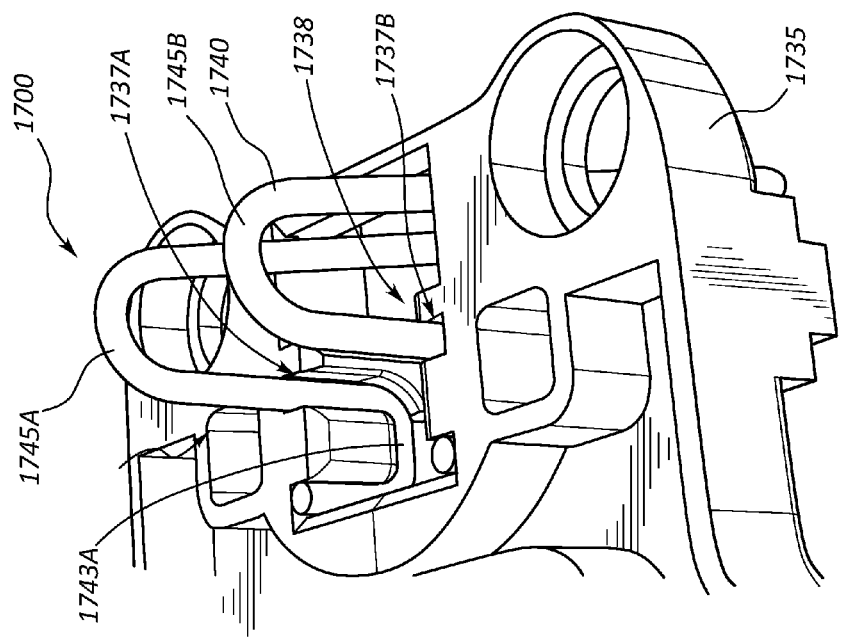
FIG. 17A is a perspective view of a portion of certain components of a driver airbag assembly according to still other embodiments taken from a first side.

Yet another embodiment of a driver airbag assembly 1700 is depicted in FIGS. 17A and 17B. In this embodiment, an intermediate plate 1735 is depicted coupled with an alternative coupling member 1740 comprising a resiliently flexible wire. Again, although only intermediate plate 1735 of assembly 1700 is depicted in these figures, those of ordinary skill in the art will appreciate that any of the other components previously discussed may be included in assembly 1700, as desired or needed. For example, the flexible wire 1740 may instead be coupled with a steering wheel armature and/or a steering wheel armature may be formed with the engagement features depicted in FIGS. 17A and 17B.

Intermediate plate 1735 comprises an opening 1738 that, as previously discussed, may be aligned with one or more other components, such as an opening in an airbag module and/or steering wheel armature, for example. In addition, as discussed below, opening 1738 comprises various recesses and features used to receive coupling member 1740.

As previously mentioned, coupling member 1740 again comprises a wire, and, preferably, a flexible wire. Like coupling member 1640, coupling member 1740 also comprises a U-shaped window 1742, which is similar to the windows previously discussed. In addition, coupling member 1740 comprises features configured to engage with corresponding features formed within opening 1738. More particularly, in the depicted embodiment, coupling member 1740 comprises two sets of opposing bends, one set of which bends in an opposite direction relative to the other set. Thus, bends 1745A and 1745B extend beyond a surface of intermediate plate 1735 opposite from the surface from which window 1742 extends, and bends 1743A and 1743B bend in the opposite direction and both terminate at endpoints of the coupling member 1740 rather than being coupled together as is the case along window 1742. As described below, bends 1745A and 1745B project beyond intermediate plate 1735 so as to allow for coupling with an adjacent component, such as a steering wheel armature, of assembly 1700.

Bends 1743A and 1743B are configured to respectively engage opposing slots 1737A and 1737B formed in intermediate plate 1735 to secure coupling member 1740 to intermediate plate 1735. However, again, alternative embodiments are contemplated in which coupling member 1740 may instead be engaged with similar or other features formed in a steering wheel armature or another element of assembly 1700.

As previously described in connection with coupling member 1640, coupling member 1740 may be configured to be engaged with the features described above of intermediate plate 1735 by squeezing, pinching, or otherwise forcing together opposing sides of coupling member 1740 (such as at or near opposing bends 1743A/1743B and/or opposing bends 1745A/1745B). This may allow for entry into opening 1738, after which these opposing sides may expand and return to their natural state, engage slots 1737A and 1737B, and lock coupling member 1740 into place. This configuration may therefore also serve as a snap-fit coupling means.

Figure 18B:
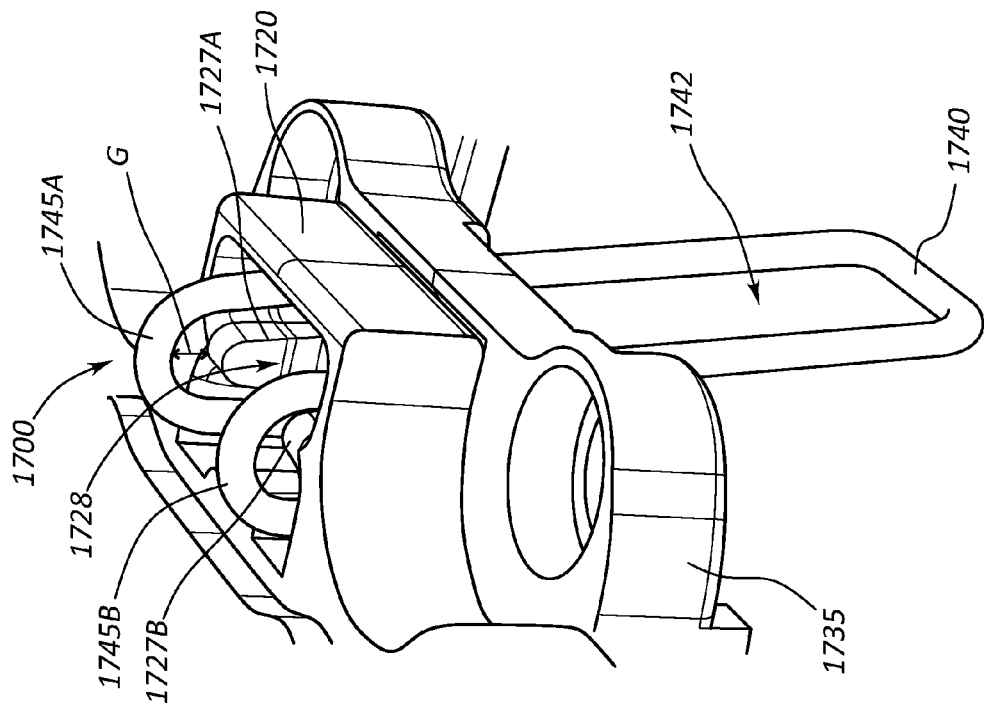
FIG. 18B is a perspective view of a portion of the driver airbag assembly of FIG. 18A taken from a second side opposite the first side.
Figure 18A:
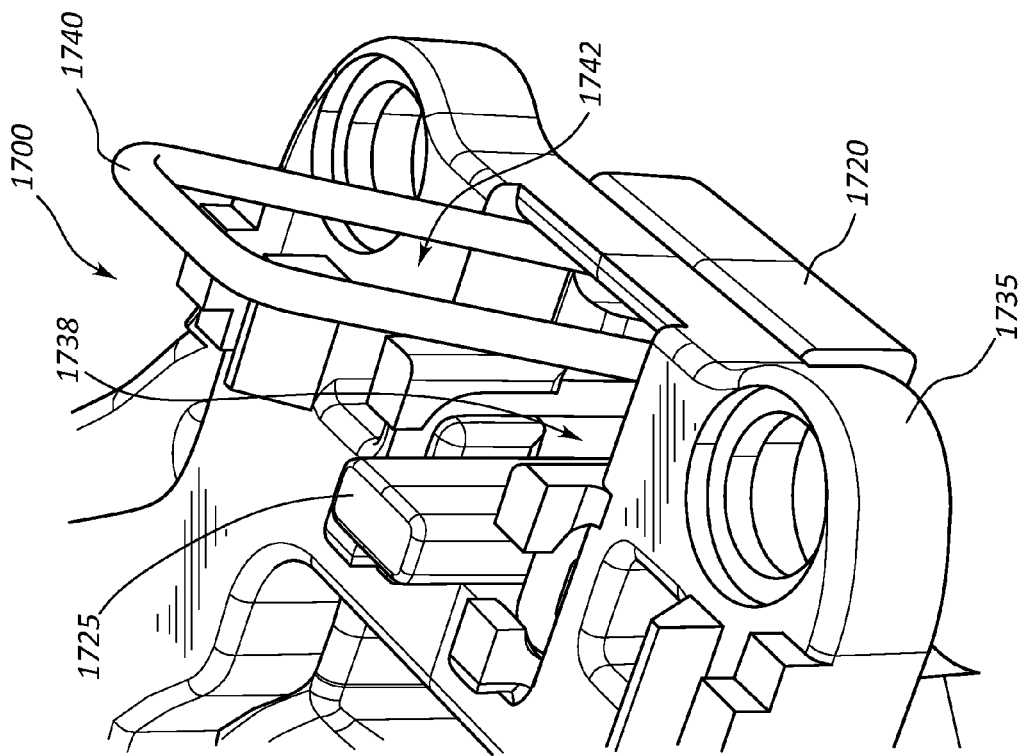
FIG. 18A is a perspective view of a portion of certain components of a driver airbag assembly according to other embodiments taken from a first side.

FIGS. 18A and 18B depict an example of a more complete assembly 1700 also including a steering wheel armature 1720 coupled with intermediate plate 1735 by way of coupling member 1740. As shown in these figures, armature 1720 comprises an opening 1728 that is at least partially aligned with opening 1738 such that coupling member 1740 can extend through both openings. In addition, armature 1720 comprises opposing protrusions 1727A and 1727B defining slots/paths that are preferably shaped in a similar manner to opposing bends 1745A and 1745B, respectively, so that armature 1720 may be coupled using coupling member 1740 in a similar manner to intermediate plate 1735.

In other words, by pinching/squeezing opposing portions of coupling member 1740 together, both opposing bends 1745A/1745B and opposing bends 1743A/1743B may be positioned adjacent to their respective engagement features in an adjacent component of assembly 1700 and then, upon releasing these opposing portions, both opposing bends 1745A/1745B and opposing bends 1743A/1743B may extend into opposing slots 1737A/1737B of intermediate plate 1735 and opposing slots defined by protrusions 1727A/1727B of armature 1720, respectively. The window 1742 of coupling member 1740 may then be coupled with a third element/layer of assembly 1700, such as an airbag module, for example.

As also depicted in these figures, some embodiments may be configured to provide for a gap having a distance "G" between coupling member 1740 and armature 1720 (or, in other contemplated embodiments, another element/layer of the assembly). In some preferred embodiments, this distance may be consistent in more than one dimension and, in some such embodiments, in all three dimensions. In other words, the distance between coupling member 1740 and armature 1720 may be the same in the X, Y, and/or Z directions such that vibration from the steering wheel is dampened in a similar manner irrespective of the direction of the vibration. In some embodiments, the distance G may be between about 1 mm and about 5 mm in at least one dimension (in some such embodiments, in two, or all three, dimensions). In some such embodiments, the distance G may be about 1.5 mm in at least one dimension (in some such embodiments, in two, or all three, dimensions).

FIG. 18A further depicts a finger 1725 extending from armature 1720, through the portion of opening 1738 in between opposing slots 1737A/1737B of intermediate plate 1735. Finger 1725, or another similar extension or block, may be used to prevent opposing bends 1743A/1743B from inadvertently being withdrawn from their respective slots. This may provide for a more secure coupling. Although finger 1725 preferably extends from armature 1720, other embodiments are contemplated in which finger 1725 may instead extend from another element of assembly 1700, or may comprise an independent piece that may be inserted into opening 1738. With respect to such embodiments, a locking mechanism may be provided for finger 1725 to keep it in place, such as a groove, ledge, pin, screw, or the like.

Figure 19:
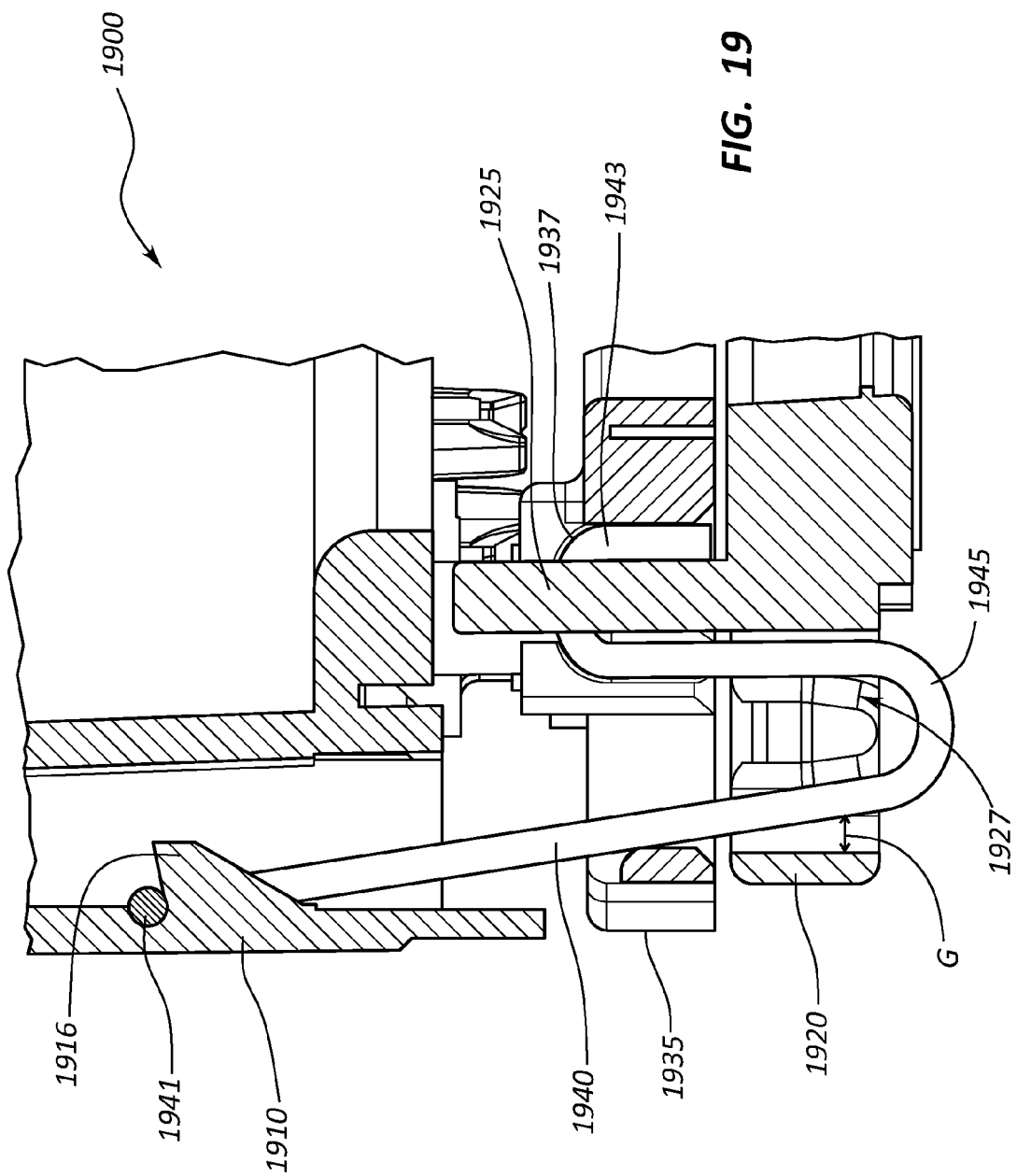
FIG. 19 is a partial, cross-sectional view of a portion of certain components of a driver airbag assembly according to other alternative embodiments.

FIG. 19 is a cross-sectional view depicting yet another embodiment of a driver airbag assembly 1900. Assembly 1900 comprises an airbag module 1910, a steering wheel armature 1920, and an intermediate member 1935 positioned in between the airbag module 1910 and the steering wheel armature 1920. Although not shown in FIG. 19, it should be understood that, similar to FIG. 13A, assembly 1900 may further comprise one or more dampening members coupled between the intermediate member 1935 and the steering wheel armature 1920. In addition, assembly 1900 may further comprise one or more horn springs (also not shown) and/or a horn spring assembly that may be directly coupled between intermediate member 1935 and airbag module 1910. Thus, as with the embodiment of FIG. 13A, the horn spring(s) and/or its associated functional assembly may be decoupled from the dampening member(s).

Assembly 1900 comprises a coupling member 1940 that comprises a flexible wire. However, coupling member/wire 1940 need not define a full window as previously described. Instead, coupling member 1940 defines a bend or hook 1941 that may be selectively engaged with a projecting member 1916 formed within an opening of airbag module 1910. In the depicted embodiment, projecting member 1916 comprises a ledge that may define a seat for hook 1941. Preferably, coupling member 1940, or at least the upper portion of coupling member that defines hook 1941, is resiliently flexible such that it can be bent to the side (to the right from the perspective of FIG. 19) and then allowed to return to its natural position and engage ledge 1916. This feature may be used in place of a full window, such as window 1742 from coupling member 1740, or may be used in addition to providing a full window.

As with assembly 1700, other features may be provided in assembly 1900 as described in connection with earlier embodiments. For example, coupling member 1940 may comprise two bends extending in opposite directions, namely, bend 1945 and bend 1943. However, unlike similar bends in coupling member 1740, these bends 1945/1943 in coupling member 1940 may only be provided in a single length of wire, rather than two parallel lengths of wire as in coupling member 1740. Bends 1945/1943 may extend through slots/paths formed in steering wheel armature 1920 and intermediate member/plate 1935, respectively, as previously described.

More particularly, bend 1945 extends through slot 1927, which may be defined by a protrusion, as previously described. Similarly, bend 1943 extends through slot 1937. A gap "G" may be maintained between coupling member 1940 and armature 1920 in one or more dimensions (in some embodiments, in all three dimensions), as also previously described. Furthermore, a finger 1925 may be provided to secure bend 1943 of coupling member 1940 in place within slot 1937. Finger 1925 comprises an integral extension of armature 1920. However, as previously discussed, alternative configurations are contemplated. In addition, it should be noted that, unlike assembly 1700, the opening through which finger 1925 extends need not include two opposing slots and/or protrusions.

Figure 20:
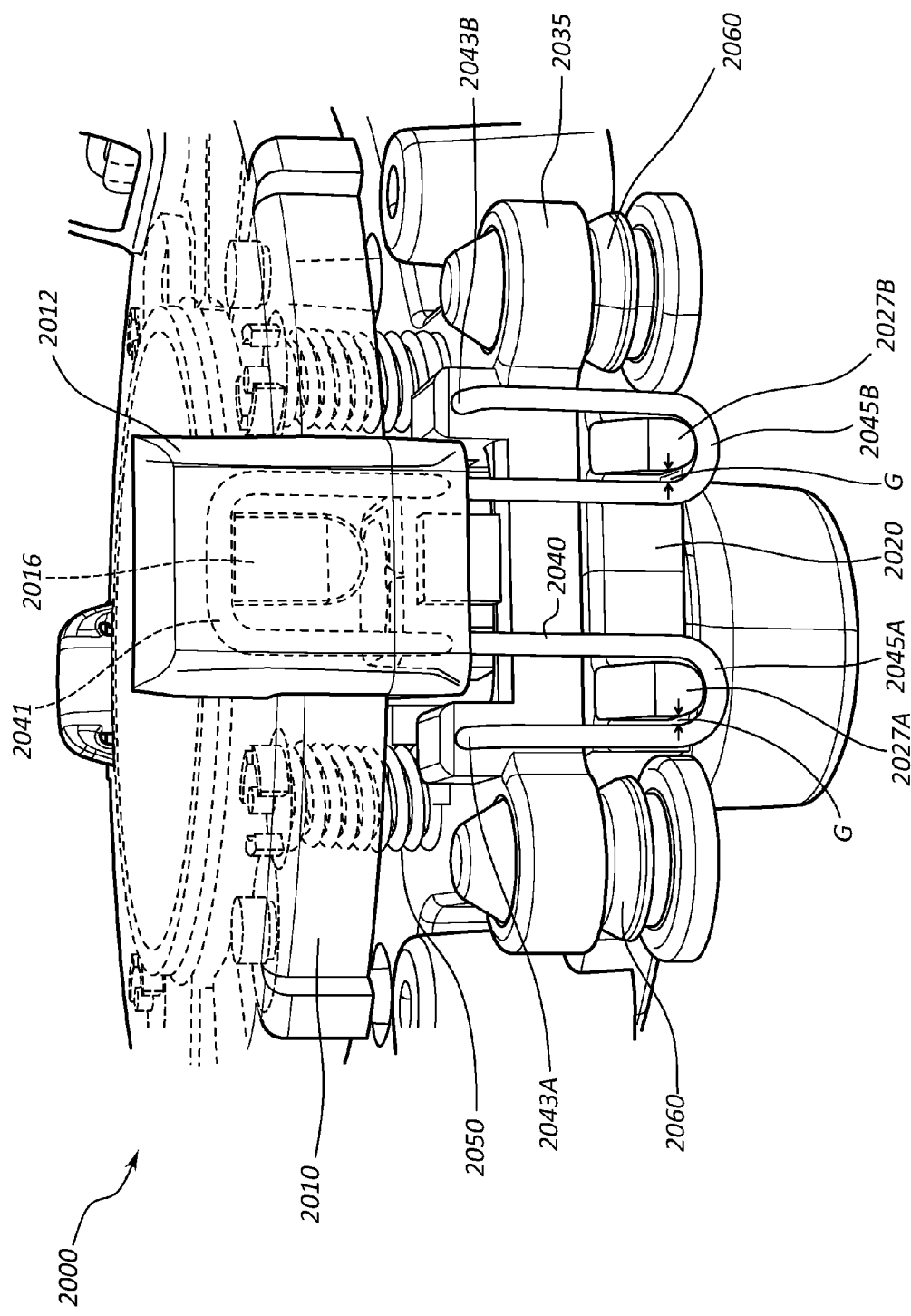
FIG. 20 is a perspective view, shown in part in phantom, of another driver airbag assembly.

FIG. 20 depicts still another driver airbag assembly 2000 according to other embodiments. FIG. 20 depicts assembly 2000 in a fully assembled state with selected portions shown in phantom to reveal underlying components. Assembly 2000 comprises an airbag module 2010, a steering wheel armature 2020, and an intermediate member 2035 positioned in between the airbag module 2010 and the steering wheel armature 2020. In the depicted embodiment, intermediate member 2035 comprises an intermediate plate. Assembly 2000 further comprises a plurality of dampening members 2060 coupled between the intermediate member 2035 and the steering wheel armature 2020. In addition, assembly 2000 further comprises a plurality of horn springs 2050 that are directly coupled between intermediate member/plate 2035 and airbag module 2010. Thus, horn springs 2050 are physically decoupled from dampening members 2060.

As previously described, assembly 2000 also comprises a plurality of flexible coupling members 2040 positioned about the periphery of the assembly that couples all three of airbag module 2010, intermediate member/plate 2035, and steering wheel armature 2020 to one another. Similar to coupling members 1740 and 1940, each of coupling members 2040 comprise wires. However, the shape of coupling members 2040 differs substantially from that of previously-disclosed embodiments.

Figure 21:
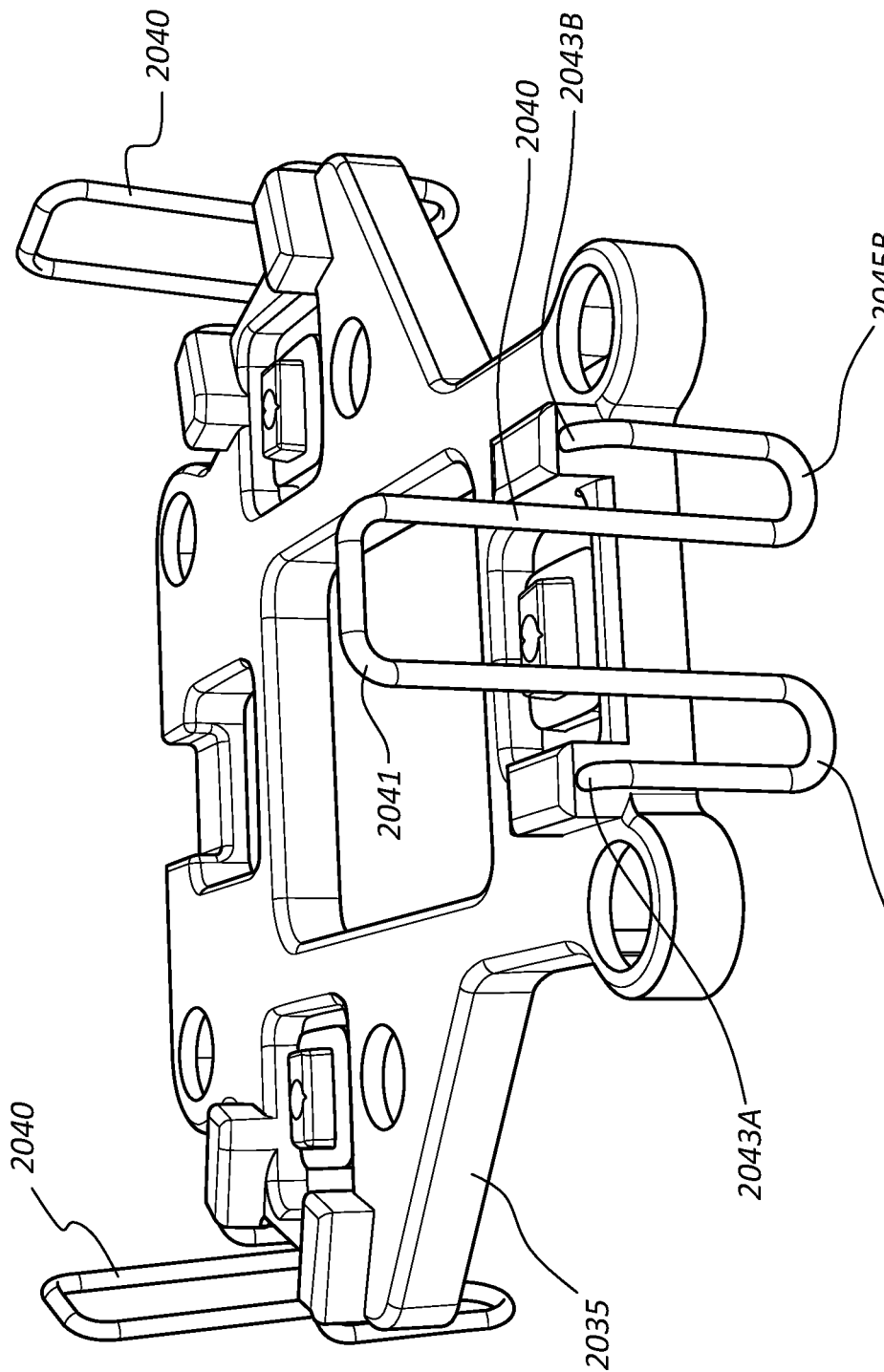
FIG. 21 is a perspective view of the intermediate member of the assembly of FIG. 20 and a plurality of coupling members used to couple the intermediate member to other components of the assembly.
Figures 22, 23:
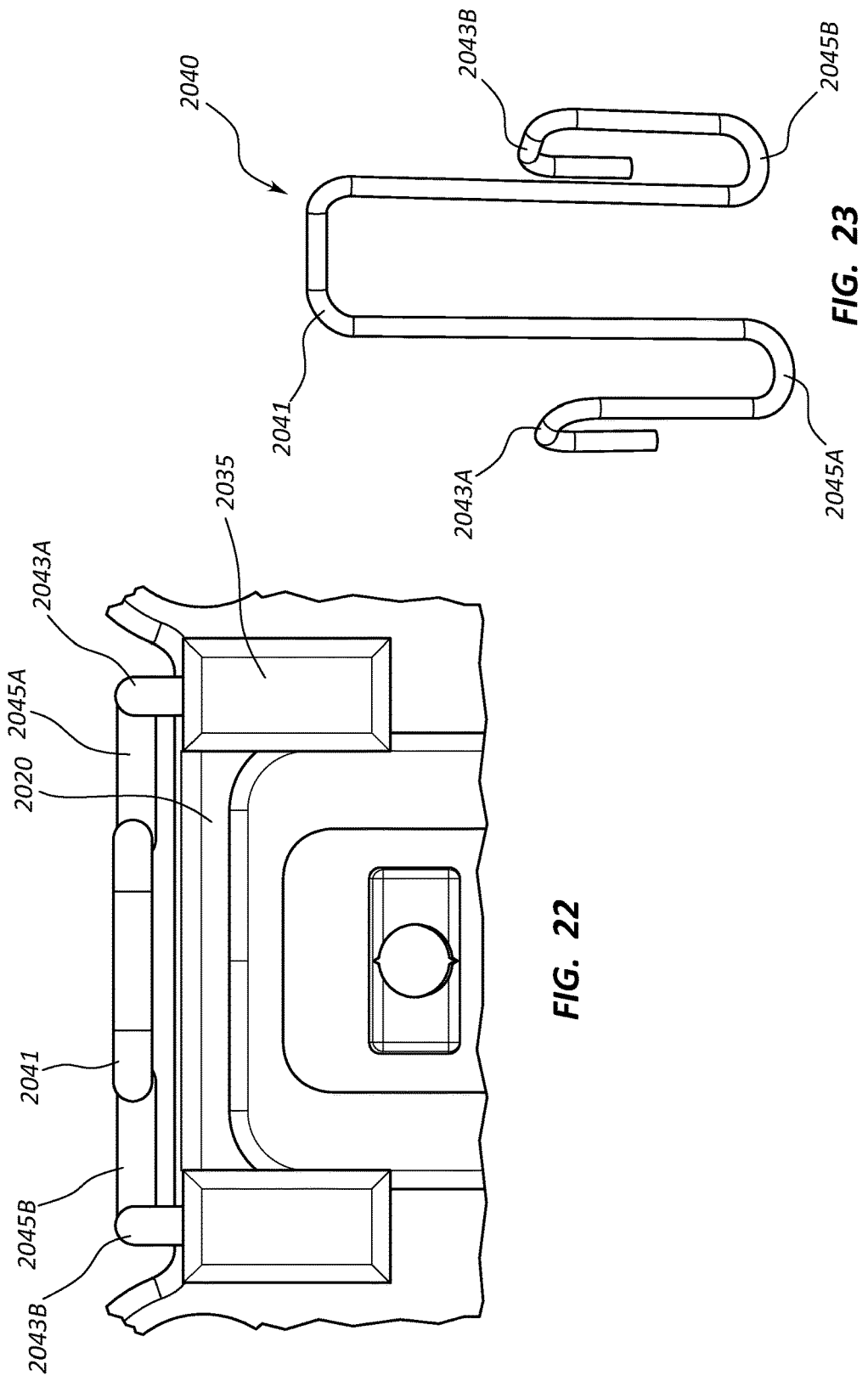
FIG. 22 is a partial plan view of one of the coupling members of the assembly of FIG. 21 illustrating how the coupling member is configured to couple two elements of the assembly along a single plane.
FIG. 23 is a perspective view of one of the coupling members of FIGS. 20-22.

To explain, and as better illustrated in FIGS. 21-23, each of wires 2040 comprises a U-shaped section 2041 at a first end and two opposing U-shaped sections 2045A and 2045B at a second end opposite from the first end. As best shown in FIG. 22, each of these sections is formed in a single plane. Thus, each of the wires 2040 is configured such that sections 2041 and 2045A/B may be used to couple with coupling elements located at the same or at least substantially the same radial position on assembly 2000. In addition, as illustrated in FIGS. 20, 21, and 23, the sections of wire 2040 that extend in the same plane generally form the shape of a "W."

Thus, as best illustrated in FIG. 20, U-shaped section 2045A extends about and is coupled to a corresponding projecting member or hook 2027A formed on steering wheel armature 2020 and, similarly, U-shaped section 2045B extends about another projecting member 2027B also formed on steering wheel armature 2020. In addition, at the opposite end of each of wires 2040, U-shaped section 2041 extends about and is coupled to a similar projecting member 2016 of airbag module 2010. As also shown in FIG. 20, a cover 2012 may be positioned over this U-shaped section 2041 of wire 2040 if desired.

It should also be noted that wire 2040 may also be used to couple module 2010 and armature 2020 to intermediate plate 2035. Thus, in some embodiments, wires 2040 may comprise additional opposing hooked sections 2043A and 2043B that extend at an angle relative to the plane previously discussed. In the depicted embodiment, hooked sections 2043A and 2043B also comprise U-shaped portions, as best seen in FIG. 23. However, alternative embodiments are contemplated in which these sections need not extend back downward in a U-shape as depicted.

Hooked sections 2043A and 2043B may be coupled to intermediate plate 2035 in a number of possible ways. For example, hooked sections 2043A and 2043B may be directly overmolded on the intermediate plate 2035, as shown in FIG. 21. Alternatively, these sections may be configured to be received in openings, slots, holes, or other coupling elements, either as previously described or as otherwise available to those of ordinary skill in the art. For example, wire 2040 may instead be snap-fit, screwed, bolted, or otherwise coupled with intermediate plate 2035. As also previously discussed, in some embodiments, wire 2040 may be flexible to allow for bending one or more portions/sections to facilitate coupling with the various elements of assembly 2000 as needed.

Finally, in some preferred embodiments, wire 2040 and/or one or more of the various coupling elements to which wire 2040 is coupled may be formed with a gap "G" in a relaxed configuration. This gap G may, in some embodiments, be consistent about the entire length of wire 2040 that extends about such coupling element(s). Thus, as shown in FIG. 20, gap G may be the same, or at least substantially the same, between wire 2040 and projecting members 2027A and 2027B along the entire portions of projecting members 2027A and 20276 that are adjacent to wire 2040. As previously mentioned, in some embodiments, the distance of gap G may be between about 1 mm and about 5 mm in at least one dimension (in some such embodiments, in two, or all three, dimensions). In some such embodiments, the distance of gap G may be about 1.5 mm in at least one dimension (in some such embodiments, in two, or all three, dimensions).

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. A vehicle steering wheel assembly, comprising:
a steering wheel armature;
an intermediate plate coupled to the steering wheel armature;
a driver airbag module coupled to the intermediate plate such that the intermediate plate is positioned in between the driver airbag module and the steering wheel armature;
a horn assembly positioned between the driver airbag module and the steering wheel armature;
at least one dampening member rigidly coupled to the intermediate plate and coupled to at least one of the steering wheel armature, driver airbag module, and a steering wheel decorative member coupled with the steering wheel armature; and at least one coupling member comprising a flexible wire configured to couple the steering wheel armature, the intermediate plate, and the driver airbag module together.

2. The vehicle steering wheel assembly of claim 1, wherein the flexible wire comprises at least one bend, and wherein at least one of the steering wheel armature and the intermediate plate comprises a slot configured to receive the at least one bend therein.

3. The vehicle steering wheel assembly of claim 2, wherein the flexible wire comprises:

a first bend extending through a first slot formed in the steering wheel armature; and a second bend extending through a second slot formed in the intermediate plate.

4. The vehicle steering wheel assembly of claim 2, wherein the at least one bend comprises a pair of opposing bends, and wherein the at least one of the steering wheel armature and the intermediate plate comprises a pair of opposing slots configured to receive the pair of opposing bends therein.

5. The vehicle steering wheel assembly of claim 4, further comprising a finger configured to extend between the pair of opposing slots so as to prevent the pair of opposing bends from being withdrawn from the pair of opposing slots.

6. The vehicle steering wheel assembly of claim 5, wherein the finger extends from the steering wheel armature.

7. The vehicle steering wheel assembly of claim 1, wherein the coupling member further comprises a plurality of windows.

8. The vehicle steering wheel assembly of claim 7, wherein the coupling member comprises an upper window configured to receive a portion of the intermediate plate therethrough, and wherein the coupling member comprises a lower window configured to receive a portion of the steering wheel armature therethrough.

9. The vehicle steering wheel assembly of claim 8, wherein the intermediate plate comprises a projecting member configured to engage the upper window, and wherein the steering wheel armature comprises a projecting member configured to engage the lower window.

10. The vehicle steering wheel assembly of claim 8, wherein the lower window is angled away from the upper window.

11. The vehicle steering wheel assembly of claim 8, wherein the lower window comprises a lower window width, wherein the upper window comprises an upper window width, and wherein the lower window width differs from the upper window width.

12. The vehicle steering wheel assembly of claim 11, wherein the intermediate plate comprises a projecting member configured to engage the upper window, wherein the steering wheel armature comprises a projecting member configured to engage the lower window, and wherein the projecting member of the intermediate plate has a width that differs from a width of the projecting member of the steering wheel armature such that the lower window can engage the projecting member of the steering wheel armature but cannot engage the projecting member of the intermediate plate.

13. The vehicle steering wheel assembly of claim 1, wherein the at least one dampening member comprises a plurality of dampening members.

14. The vehicle steering wheel assembly of claim 1, wherein the horn assembly comprises at least one horn actuation member, and wherein the at least one horn actuation member is rigidly coupled between the driver airbag module and the intermediate plate.

15. The vehicle steering wheel assembly of claim 14, wherein the at least one horn actuation member comprises a horn spring.

16. A driver airbag cushion assembly, comprising:

a driver airbag module;

an intermediate member coupled to the driver airbag module, wherein the driver airbag module is configured to be coupled to a steering wheel armature;

at least one dampening member rigidly coupled with the intermediate member, wherein the at least one dampening member is further configured to be rigidly coupled to at least one of the driver airbag module and a steering wheel armature, and wherein the driver airbag cushion assembly is configured to be coupled with a steering wheel armature such that the at least one dampening member is either: (1) rigidly coupled to the driver airbag module and such that at least one horn spring associated with a horn of a vehicle steering wheel comprising the steering wheel armature is directly coupled to the steering wheel armature; or (2) rigidly coupled to the steering wheel armature and such that at least one horn spring associated with a horn of a vehicle steering wheel comprising the steering wheel armature is directly coupled to the driver airbag module; and at least one horn spring directly coupled with the driver airbag module, wherein the at least one dampening member is configured to extend through an opening in the steering wheel armature, and wherein the at least one dampening member is further configured to extend through an opening in the intermediate member.

17. The driver airbag cushion assembly of claim 16, wherein the intermediate member comprises an intermediate plate.

18. A vehicle steering wheel assembly, comprising:

a steering wheel armature;

an intermediate plate coupled to the steering wheel armature;

a driver airbag module coupled to the intermediate plate such that the intermediate plate is positioned in between the driver airbag module and the steering wheel armature;

a horn assembly comprising at least one horn spring, wherein the at least one horn spring is directly coupled to the driver airbag module and positioned between the driver airbag module and the steering wheel armature; and at least one dampening member coupled to the intermediate plate, wherein the at least one dampening member is not directly coupled to the driver airbag module.

19. The vehicle steering wheel assembly of claim 18, wherein the at least one dampening member is coupled to the intermediate plate, and wherein the at least one dampening member is rigidly coupled to the steering wheel armature.

20. The vehicle steering wheel assembly of claim 18, further comprising a plurality of coupling members non-rigidly coupling the steering wheel armature, the intermediate plate, and the driver airbag module together.

21. The vehicle steering wheel assembly of claim 20, wherein each of the plurality of coupling members is configured to engage a corresponding projecting member of at least one of the steering wheel armature, the intermediate plate, and the driver airbag module.

22. The vehicle steering wheel assembly of claim 21, wherein each of the plurality of coupling members comprises at least two windows, and wherein the at least two windows differ in at least one of size and shape so as to prevent a lower window of the at least two windows from engaging a projecting member of the steering wheel armature.

\* \* \* \* \*